(12) United States Patent
Hannuksela

(10) Patent No.: US 12,041,108 B2
(45) Date of Patent: Jul. 16, 2024

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Hannuksela, Tampere (FI)

(73) Assignee: Nokia Technologies Oy, Epoo (FI)

( * ) Notice: Subject to any disclaimer, the term of this patent is extended or adjusted under 35 U.S.C. 154(b) by 617 days.

(21) Appl. No.: 17/272,854

(22) PCT Filed: Sep. 5, 2019

(86) PCT No.: PCT/FI2019/050637
§ 371 (c)(1),
(2) Date: Mar. 2, 2021

(87) PCT Pub. No.: WO2020/053477
PCT Pub. Date: Mar. 19, 2020

(65) Prior Publication Data
US 2021/0194946 A1    Jun. 24, 2021

(30) Foreign Application Priority Data

Sep. 12, 2018  (FI) .................................. 20185759

(51) Int. Cl.
H04N 19/70    (2014.01)
H04L 65/70    (2022.01)

(52) U.S. Cl.
CPC ............. *H04L 65/70* (2022.05); *H04N 19/70* (2014.11)

(58) Field of Classification Search
CPC .... H04N 13/178; H04N 19/597; H04N 19/70; H04N 19/167; H04N 19/17; H04N 21/816; H04N 21/8456; H04N 21/85406; H04L 65/70
USPC ..................................................... 375/240.01
See application file for complete search history.

(56) References Cited

U.S. PATENT DOCUMENTS

| | | | |
|---|---|---|---|
| 9,800,893 B2* | 10/2017 | Lainema | H04N 19/573 |
| 10,893,256 B2* | 1/2021 | Hannuksela | H04N 21/26258 |
| 11,082,719 B2* | 8/2021 | Hannuksela | H04N 19/167 |
| 2005/0254427 A1* | 11/2005 | Leon | H04L 47/30 370/428 |
| 2011/0064146 A1* | 3/2011 | Chen | H04N 21/234327 375/240.26 |

(Continued)

FOREIGN PATENT DOCUMENTS

| | | | | |
|---|---|---|---|---|
| EP | 3349467 A1 * | 7/2018 | ....... | H04N 21/21805 |
| EP | 3349467 A1 | 7/2018 | | |

(Continued)

OTHER PUBLICATIONS

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v1, Oct. 7-16, 2020, pp. 1-511.

(Continued)

*Primary Examiner* — Behrooz M Senfi
(74) *Attorney, Agent, or Firm* — Harrington & Smith

(57) ABSTRACT

A method comprising: writing, in a container file, at least one first entry comprising a first part of a slice segment header; indicating, in the container file, for a sample which entry of the at least one first entry applies; and authoring the sample without the first part of the slice segment header.

15 Claims, 12 Drawing Sheets

(56) References Cited

U.S. PATENT DOCUMENTS

2017/0346873 A1 11/2017 Denoual et al.

FOREIGN PATENT DOCUMENTS

| EP | 3422724 A1 | 1/2019 |
|---|---|---|
| GB | 2516825 A | 2/2015 |
| GB | 2575288 B | 5/2022 |
| WO | 2015/051497 A1 | 4/2015 |
| WO | 2017/140945 A1 | 8/2017 |
| WO | 2018/083378 A1 | 5/2018 |
| WO | 2018/115572 A2 | 6/2018 |
| WO | 2018/146376 A1 | 8/2018 |
| WO | 2019/002662 A1 | 1/2019 |

OTHER PUBLICATIONS

Office action received for corresponding Chinese Patent Application No. 201980074367.9, dated Dec. 5, 2022, 8 pages of office action and no page of translation available.

Extended European Search Report received for corresponding European Patent Application No. 19861055.2, dated May 10, 2022, 11 pages.

Hannuksela, "[OMAF][14496-15] 'scat' and 'sabt' track references to track group", Nokia, ISO/IEC JTC1/SC29/WG11 MPEG2017/M41450, Oct. 2017, 3 pages.

Wang et al., "[OMAF] Editor's Input Text for OMAF WD Based on Finland AHG Agreements", OMAF v2 Editors, ISO/IEC JTC1/SC29/WG11/M42923-v1, Jul. 2018, 200 pages.

"Information Technology—Coding of Audio-Visual Objects—Part 15: Advanced Video Coding (AVC) File Format", ISO/IEC 14496-15, First edition, Apr. 15, 2004, 29 pages.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

Brandenburg et al., "Adding Slice Segment Header Length Information to ISOBMFF", ISO/IEC JTC1/SC29/WG11 MPEG2018/m43397, Tiledmedia, Jul. 2018, 2 pages.

Hannuksela et al., "[14496-15] Slice Segment Header Length Signaling", ISO/IEC JTC1/SC29/WG11 MPEG2018/M43541, Nokia, Jul. 2018, 6 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222, Mar. 2017, 291 pages.

"Information Technology—Coding of Audio-Visual Objects—Part 12: ISO Base Media File Format", ISO/IEC 14496-12, Fifth edition, Dec. 15, 2015, 248 pages.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"3rd Generation Partnership Project; Technical Specification Group Services and System Aspects; Transparent end-to-end Packet-switched Streaming Service (PSS);Protocols and codecs (Release 15)", 3GPP TS 26.234, V15.0.0, Dec. 2017, pp. 1-173.

"Information Technology—Dynamic Adaptive Streaming over HTTP (DASH)—Part 1: Media Presentation Description andSegment Formats", ISO/IEC 23009-1, Second Edition, May 15, 2014, 152 pages.

"3rd Generation Partnership Project; Technical Specification Group Services and System Aspects; Transparent end-to-end Packet-switched Streaming Service (PSS);Progressive Download and Dynamic Adaptive Streaming over HTTP (3GP-DASH) (Release 15)", 3GPP TS 26.247, V15.3.0, Jun. 2018, pp. 1-132.

Pantos et al., "HTTP Live Streaming", RFC 8216, Independent Submission, Aug. 2017, pp. 1-60.

Office action received for corresponding Finnish Patent Application No. 20185759, dated Apr. 5, 2019, 9 pages.

International Search Report and Written Opinion received for corresponding Patent Cooperation Treaty Application No. PCT/FI2019/050637, dated Mar. 23, 2020, 13 pages.

* cited by examiner

APPARATUS, A METHOD AND A COMPUTER PROGRAM FOR VIDEO CODING AND DECODING

RELATED APPLICATION

This application claims priority to PCT Application No. PCT/FI2019/050637, filed on Sep. 5, 2019, which claims priority to Finnish Application No. 20185759, filed on Sep. 12, 2018, each of which is incorporated herein by reference in its entirety.

TECHNICAL FIELD

The present invention relates to an apparatus, a method and a computer program for video coding and decoding.

BACKGROUND

Recently, the development of various multimedia streaming applications, especially 360-degree video or virtual reality (VR) applications, has advanced with big steps. In viewport-adaptive streaming, the bitrate is aimed to be reduced e.g. such that the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display (HMD), another version of the content needs to be streamed, matching the new viewing orientation.

There are several alternatives to deliver the viewport-dependent omnidirectional video. It can be delivered, for example, as equal-resolution High Efficiency Video Coding (HEVC) bitstreams with motion-constrained tile sets (MCTSs). Thus, several HEVC bitstreams of the same omnidirectional source content are encoded at the same resolution but different qualities and bitrates using motion-constrained tile sets.

Tile-based viewport-dependent delivery of 360° video involves a great number of tile or sub-picture tracks, each containing a slice segment header for an independent slice segment. For example, 96 tiles resulting into 96 tile or sub-picture tracks may be used in a cube map projection format. Similarly, it is expected that for achieving point cloud or volumetric video streaming that adapts to viewing position and/or viewing orientation, a big number of tile or sub-picture tracks, each containing a set of patches, would be used.

The length of the independent slice segment header varies but is typically at least 4 bytes. Slice segment header for tile tracks may be even larger. The overhead bitrate caused by slice segment headers is therefore significant.

SUMMARY

Now in order to at least alleviate the above problems, an enhanced encoding method is introduced herein.

A method according to a first aspect comprises writing, in a container file, at least one first entry comprising a first part of a slice segment header; indicating, in the container file, for a sample which entry of the at least one first entry applies; and authoring the sample without the first part of the slice segment header.

An apparatus according to a second aspect comprises means for means for writing, in a container file, at least one first entry comprising a first part of a slice segment header; means for indicating, in the container file, for a sample which entry of the at least one first entry applies; and means for authoring the sample without the first part of the slice segment header.

According to an embodiment, the apparatus further comprises means for writing, in the container file, at least one second entry comprising a set of second parts of slice segment headers, wherein the second parts comprise different syntax elements than the first part; means for indicating, in the container file, for the sample which entry of the at least one second entry applies; and means for authoring the sample without the set of second parts of the slice segment headers.

According to an embodiment, the apparatus further comprises means for writing in the container file a slice segment data track with samples comprising slice segment data without slice segment header; means for authoring the sample without slice segment data; and means for indicating, in the container file, that the slice segment data for the sample resides in the slice segment data track.

According to an embodiment, indication that the slice segment data for the sample resides in the slice segment data track comprises one of the following:

A track reference of a particular type to the slice segment data track

A track reference of a particular type to a track group comprising the slice segment data track.

According to an embodiment, a sample structure for the slice segment data track comprises one or more slice segment NAL-unit-like structures comprising one or more of the following:

an implicit reference to an entry of the first list of entries and/or an entry of the second list of entries an implicit reference to an associated sample in a slice segment data track.

According to an embodiment, the at least one first entry and/or the at least one second entry comprises one of the following structures:

A sample group description box

A box contained in a MovieBox and/or in MovieFragmentBox(es)

A sample-to-group box

A box contained in a SampleTableBox and/or in TrackFragmentBox(es).

According to an embodiment, the apparatus further comprises means for encapsulating each sequence of independent slice segments as a tile track indicated to belong to the same track group; and means for creating a tile base track, wherein each sample of the tile base track comprises one or more coded pictures comprising or inferred to comprise N independent slice segments, where N may differ between tile base tracks, and wherein the tile base track comprises an indication that the track group applies for each slice segment.

A method according to a third aspect comprises parsing, from a container file, at least one first entry comprising a first part of a slice segment header; parsing, from the container file, for a sample which entry of the at least one first entry applies; and reconstructing a slice segment of the sample from the applied entry of the first at least one entry and slice segment data.

An apparatus according to a fourth aspect comprises means for parsing, from a container file, at least one first entry comprising a first part of a slice segment header; means for parsing, from the container file, for a sample which entry of the at least one first entry applies; and means for reconstructing a slice segment of the sample from the applied entry of the first at least one entry and slice segment data.

According to an embodiment, the apparatus further comprises means for parsing, from the container file, at least one second entry comprising a set of second parts of a slice segment header, wherein the second part comprises different syntax elements than the first part; means for parsing, from the container file, for the sample which entry of the at least one second entry applies; and means for reconstructing the slice segment also from the applied entry of the at least one second entry.

According to an embodiment, the apparatus further comprises means for parsing, from the container file, an indication that the slice segment data for the sample resides in a slice segment data track with samples comprising slice segment data without slice segment header; means for reading, from the container file, a time-aligned sample of the slice segment data track; and means for reconstructing the slice segment on the basis of the slice segment data carried in the time-aligned sample.

According to an embodiment, the apparatus further comprises means for parsing, from the container file, a tile base track that has a suitable decoding capacity requirement; means for concluding a number of independent slice segments the samples of the slice segment data track contains; means for selecting, from a track group, one or more tile tracks covering at least a viewport; and means for reconstructing a coded picture according to a reconstruction process for raw byte sequence payloads (RBSPs).

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
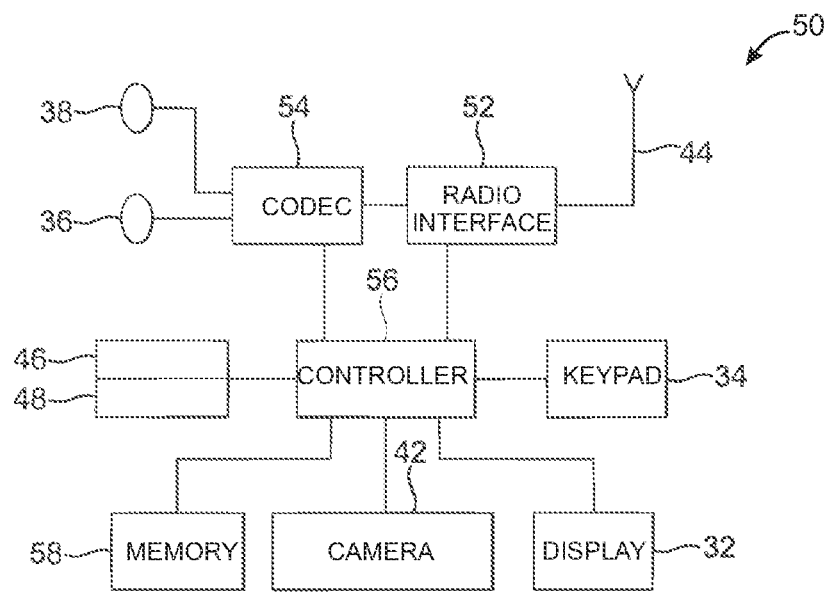
FIG. 1 shows schematically an electronic device employing embodiments of the invention.
Figure 2:
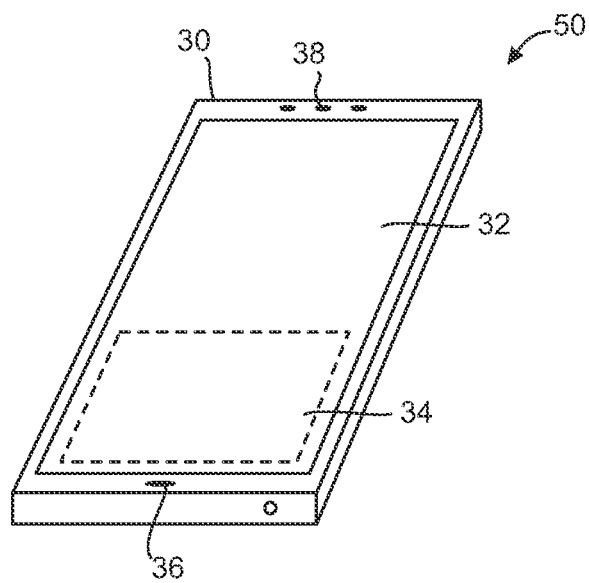
FIG. 2 shows schematically a user equipment suitable for employing embodiments of the invention.

The following describes in further detail suitable apparatus and possible mechanisms for viewport adaptive streaming. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
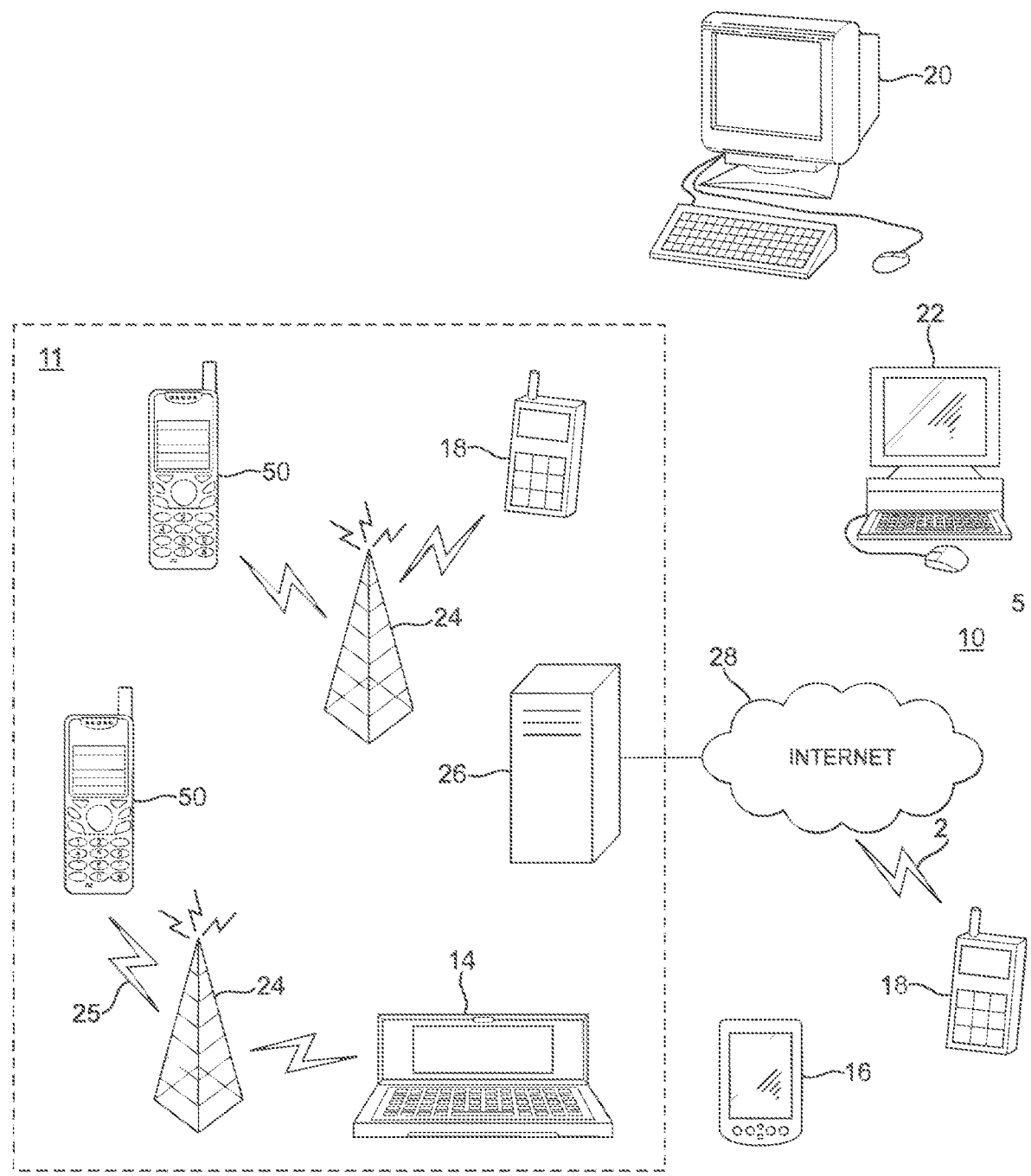
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'indat' box and the movie 'moov' box may be used to enclose the metadata. In some cases, for a file to be operable, both of the 'indat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

aligned(8) class TrackReferenceBox extends Box('tref')
{
    TrackReferenceTypeBox [ ];
}
aligned(8) class TrackReferenceTypeBox (unsigned int (32)
reference_type) extends Box(reference_type) {
    unsigned int(32) track_IDs[ ];
} track_IDs may be specified as an array of integers providing the track identifiers of the referenced tracks or track group id values of the referenced track groups. Each value of track_IDs[i], where i is a valid index to the track_IDs[ ] array, is an integer that provides a reference from the containing track to the track with track ID equal to track_IDs[i] or to the track group with both track group id equal to track_IDs[i] and a particular bit (e.g. the least significant bit) of the flags field of TrackGroupTypeBox equal to 1. When a track group id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping type_parameter field that can be used e.g. to indicate a sub-type of the grouping.

A draft amendment to the ISO Base Media File Format standard explains compact sample-to group mapping as follows:

Box Type: 'csgp'
Container: SampleTableBox or TrackFragmentBox
Mandatory: No
Quantity: Zero or more.

The compact sample to group box provides a more compact way to represent the mapping from sample to group, especially in the cases where there are repeating patterns, and when there are few sample groups of a particular type.

The design uses a vector of concatenated patterns each of which is used once by a mapping array, which associates runs of samples with repeats of that pattern. This is illustrated by the following example. In the following, each letter represents a different sample group description index value (possibly 0).

If a track has the following associations, starting from the first sample:
abcb abcb abcxx abcb abdb
those associations might be represented by the following:

```
1. pattern_length=4; sample_count=11;
2. pattern_length=1; sample_count=2;
3. pattern_length=4; sample_count=6;
4. pattern_length=2; sample_count=2;
pattern=[
    a b c b          // pattern 1 of length 4
    x                // pattern 2 of length 1
    a b c b          // pattern 3 of length 4
    d b              // pattern 4 of length 2
]   // the pattern_length is thus 4+1+4+2=11
```

When sample_count[i] is equal to pattern_length[i], the pattern is not repeated.

When sample_count[i] is greater than pattern_length[i], the sample_group_description_index values of the i-th pattern are used repeatedly to map the sample_count[i] values. It is not necessarily the case that sample_count[i] is a multiple of pattern_length[i]; the cycling may terminate in the middle of the pattern.

When the total of the sample_count[i] values for all values of i in the range of 1 to pattern_count, inclusive, is less than the total sample_count, the reader should associate the samples that have no explicit group association with the default group defined in the SampleDescriptionGroupBox, if any, or else with no group.

It is an error for the total of the sample_count[i] values to be greater than the total count of actual samples described by the encompassing TrackBox or TrackFragmentBox, and the reader behaviour would then be undefined.

Syntax:

```
aligned (8) class Compact SampleToGroupBox
    extends FullBox ('csgp', version, 0)
{
    unsigned int (32) grouping_type; unsigned int (1)
    index_msb_indicates_fragment_local_description;
    unsigned int (1) grouping_type_parameter_present;
    unsigned int (6) field_size_minus_1;
    if (grouping_type_parameter_present == 1) {
        unsigned int (32) grouping_type_parameter;
    }
    unsigned int (32) pattern_count;
    totalPatternLength = 0;
    for (i=1; i <= pattern_count; i++) {
        unsigned int (32) pattern_length [i];
        unsigned int (32) sample_count [i];
        totalPatternLength += pattern_length[i];
    }
    for (j=1; j <= pattern_count; j++) {
        for (k=1; k <= pattern_length[j]; k++) {
            unsigned int (field_size)
        sample_group_description_index[j] [k];
        // whose msb might indicate fragment_local or global
        }
    }
}
```

Semantics:

version is an integer that specifies the version of this box, currently 0.

grouping type is an integer that identifies the type (i.e. criterion used to form the sample groups) of the sample grouping and links it to its sample group description table with the same value for grouping type. At most one occurrence of either the 'csgp' or 'sbgp' with the same value for grouping type (and, if used, grouping type_parameter) shall exist for a track.

grouping type_parameter is an indication of the sub-type of the grouping.

index_msb_indicates_fragment_local_description is a flag that must be zero when this box appears inside a 'trak' box but may be 0 or 1 when this box appears inside a 'traf' box. When it is 1, it indicates that the most significant bit (MSB) of every sample_group_description_index does not form part of the index number but instead indicates which 'sgpd' box the group description is to be found in: if the MSB is 0, the index identifies a group description from the 'trak' box's 'sgpd' box; if the MSB is 1, the index identifies a group description from the 'traf' box's 'sgpd' box.

field_size is an integer specifying the size in bits of the entries in the array of sample_group_description_index values; it shall take the value 3, 7, 15 or 31, indicating field sizes of 4, 8, 16, 32 respectively. If the field_size 4 is used, then each byte contains two values: entry[i]<<4+entry[i+1]; if the sizes do not fill an integral number of bytes, the last byte is padded with zeros.

pattern_count indicates the length of the associated pattern in the pattern array that follows it. The sum of the included sample_count values indicates the number of mapped samples.

pattern_length[i] corresponds to a pattern within the second array of sample_group_description_index[j] values. Each instance of pattern_length[i] shall be greater than 0.

sample_count[i] specifies the number of samples that use the i-th pattern. sample_count[i] shall be greater than zero, and sample_count[i] shall be greater than or equal to pattern_length[i].

sample_group_description_index[j][k] is an integer that gives the index of the sample group entry which describes the samples in this group. The index ranges from 1 to the number of sample group entries in the SampleGroupDescriptionBox, inclusive, or takes the value 0 to indicate that this sample is a member of no group of this type.

In the description and embodiments, a compact sample-to-group box or alike may be used equivalently when a sample-to-group box or SampleToGroupBox is referred.

A sub-sample may be defined as a contiguous range of bytes of a sample. Information on sub-samples may be given in SubSampleInformationBox(es) that may be contained in the SampleTableBox and/or TrackFragmentBox(es). Specific definition of a sub-sample may be for a given coding system and/or for a given encapsulation format of a coding system (e.g. particular sample entry type) and/or may be further specified using the flags field of the containing SubSampleInformationBox. For example, values of the flags field for HEVC can indicate a sub-sample addressed by the SubSampleInformationBox is a NAL unit, a decoding unit, a tile, a coding tree unit row, a slice, or a coded picture. When more than one SubSampleInformationBox is present in the same container box, the value of flags may be required to differ in each of these SubSampleInformationBoxes. The syntax of SubSampleInformationBox may be specified as follows:

```
aligned (8) class SubSampleInformationBox
    extends FullBox ('subs', version, flags) {
    unsigned int (32) entry_count;
    int i, j;
    for (i=0; i < entry_count; i++) {
        unsigned int (32) sample_delta;
        unsigned int (16) subsample_count;
        if (subsample_count > 0) {
            for (j=0; j < subsample_count; j++) {
                if (version == 1)
                {
                    unsigned int (32) subsample_size;
                }
                else
                {
                    unsigned int (16) subsample_size;
                }
                unsigned int (8) subsample_priority;
                unsigned int (8) discardable;
                unsigned int (32) codec_specific_parameters;
            }
        }
    }
}
```

The semantics of syntax elements of SubSampleInformationBox may be specified as follows: version is an integer that specifies the version of this box. entry_count is an integer that gives the number of entries in the following table. sample_delta is an integer that indicates the sample having sub-sample structure. It is coded as the difference, in decoding order, between the desired sample number, and the sample number indicated in the previous entry. If the current entry is the first entry in the track, the value indicates the sample number of the first sample having sub-sample information, that is, the value is the difference between the sample number and zero (0). If the current entry is the first entry in a track fragment with preceding non-empty track fragments, the value indicates the difference between the sample number of the first sample having sub-sample information and the sample number of the last sample in the previous track fragment. If the current entry is the first entry in a track fragment without any preceding track fragments, the value indicates the sample number of the first sample having sub-sample information, that is, the value is the difference between the sample number and zero (0). This implies that the sample_delta for the first entry describing the first sample in the track or in the track fragment is always 1. subsample_count is an integer that specifies the number of sub-sample for the current sample. If there is no sub-sample structure, then this field takes the value 0. subsample_size is an integer that specifies the size, in bytes, of the current sub-sample. subsample_priority is an integer specifying the degradation priority for each sub-sample. Higher values of subsample_priority, indicate sub-samples which are important to, and have a greater impact on, the decoded quality. discardable equal to 0 means that the sub-sample is required to decode the current sample, while equal to 1 means the sub-sample is not required to decode the current sample but may be used for enhancements, e.g., the sub-sample consists of supplemental enhancement information (SEI) messages. codec_specific_parameters is defined by the codec and/or its encapsulation format (e.g. sample entry type) in use. If no such definition is available, this field is set to 0.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
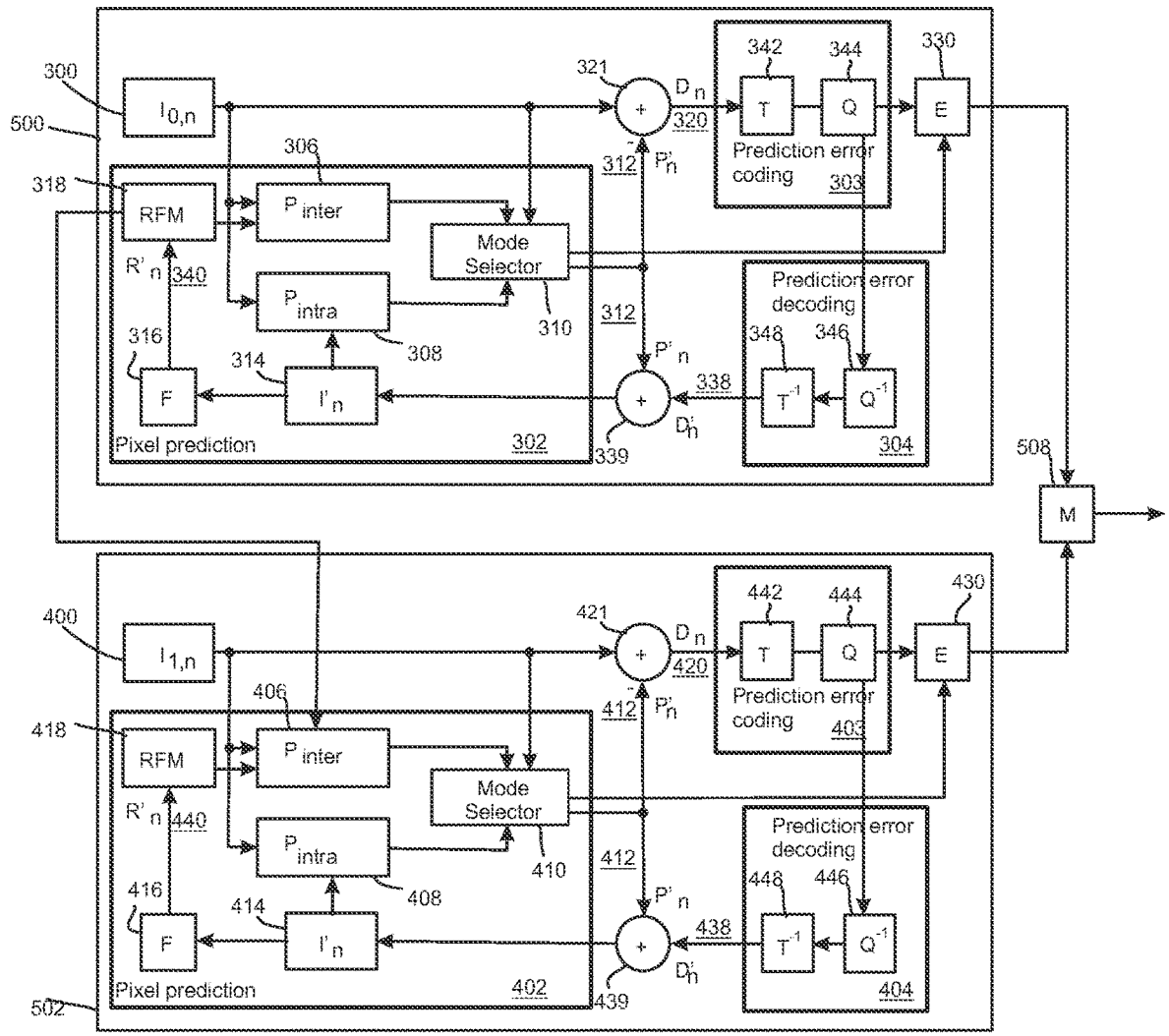
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The standardization of the Versatile Video Coding (VVC, H.266, or H.266/VVC) standard has been started in the Joint Video Experts Team (WET) of ITU-T and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized. Many aspects described below in the context of H.264/AVC or HEVC may apply to VVC, and the aspects of the invention may hence be applied to VVC.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The slice segment header RBSP syntax starts as follows:

| slice_segment_layer_rbsp( ) { | Descriptor |
|---|---|
| slice_segment_header( ) | |
| slice_segment_data( ) | |
| rbsp_slice_segment_trailing_bits( ) | |
| } | |

The slice_segement_header( ) syntax starts as follows:

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
|   no_output_of_prior_pics_flag | u(1) |
| slice_pic_parameter_set_id | ue(v) |
| if( !first_slice_segment_in_pic_flag ) { | |
|   if( dependent_slice_segments_enabled_flag ) | |
|     dependent_slice_segment_flag | u(1) |
|   slice_segment_address | u(v) |
| } | |
| if( !dependent_slice_segment_flag ) { | |
|   for( i = 0; i < num_extra_slice_header_bits; i++ ) | |
|     slice_reserved_flag[ i ] | u(1) |
|   slice_type | ue(v) |
|   if( output_flag_present_flag ) | |
|     pic_output_flag | u(1) |
| . . . | |

Herein, first slice segment in_pic_flag and slice_segment_address depend on the position of the slice segment within the picture, while the values of other syntax elements are many times unchanged in all independent slice segments of the same coded picture.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

It needs to be understood that even though some examples and embodiments are described with respect to MCTSs, they could be similarly realized with other similar concepts of independently decodable spatiotemporal units. Moreover, motion constraints for such spatiotemporal units could be specified similarly to how MCTSs above. Example of such spatiotemporal units include but are not limited to motion-constrained slices and motion-constrained pictures. A motion-constrained slice is such that the inter prediction process is constrained in encoding such that no syntax or derived variables outside the motion-constrained slice, no sample value outside the motion-constrained slice, and no sample value at a fractional sample position that is derived using one or more sample values outside the motion-constrained slice, is used for inter prediction of any sample within the motion-constrained slice. A motion-constrained picture is such that the inter prediction process is constrained in encoding such that no syntax or derived variables outside the motion-constrained picture without special consideration of picture boundaries, no sample value outside the motion-constrained picture without special consideration of picture boundaries, and no sample value at a fractional sample position that is derived using one or more sample values outside the motion-constrained picture without special consideration of picture boundaries, is used for inter prediction of any sample within the motion-constrained picture. Such special consideration of picture boundaries could for example be saturation of coordinates to be within picture boundaries and inferring blocks or motion vectors outside picture boundaries to be unavailable in a prediction process. When the phrase spatiotemporal unit is used in the context of a single time instance or single picture, it can be considered as a spatial unit, corresponding to a certain subset of a coded picture and, when decoded, a certain subset of a decoded picture area.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A coded video sequence may be defined as such a sequence of coded pictures in decoding order that is independently decodable and is followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to comprise arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

Terms 360-degree video or virtual reality (VR) video may be used interchangeably. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

Figure 5:
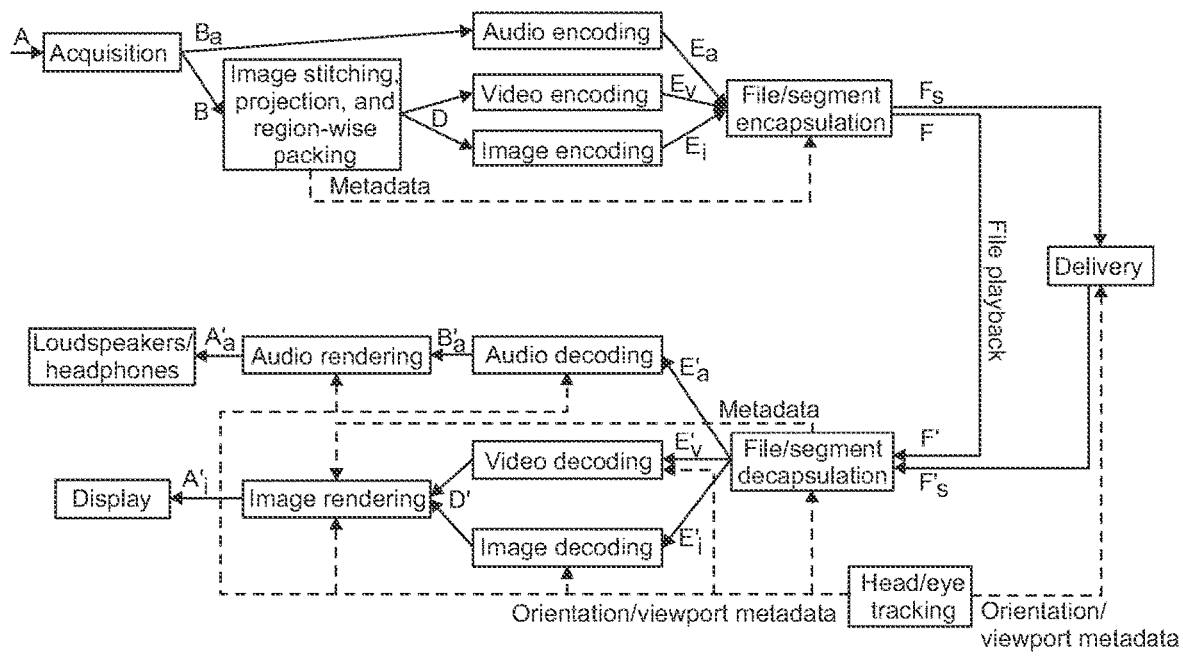
FIG. 5 shows an example of MPEG Omnidirectional Media Format (OMAF) concept.

MPEG Omnidirectional Media Format (OMAF) is described in the following by referring to FIG. 5. A real-world audio-visual scene (A) is captured by audio sensors as well as a set of cameras or a camera device with multiple lenses and sensors. The acquisition results in a set of digital image/video (Bi) and audio (Ba) signals. The cameras/lenses typically cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals typically conform to one of the loudspeaker layouts defined in CICP. In an omnidirectional media application, the loudspeaker layout signals of the rendered immersive audio program are binaraulized for presentation via headphones.

The images (Bi) of the same time instance are stitched, projected, and mapped onto a packed picture (D).

Figure 6A:
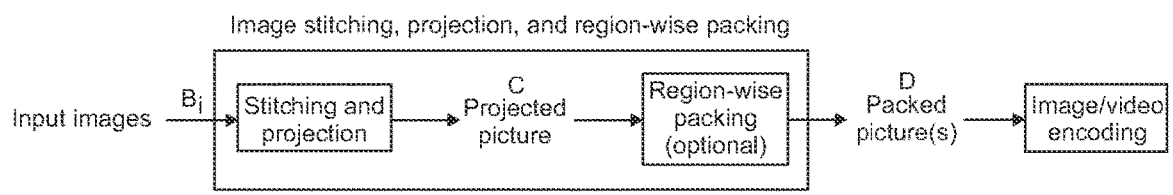
FIGS. 6a and 6b show two alternative methods for packing 360-degree video content into 2D packed pictures for encoding.

For monoscopic 360-degree video, the input images of one time instance are stitched to generate a projected picture representing one view. The breakdown of image stitching, projection, and region-wise packing process for monoscopic content is illustrated with FIG. 6a and described as follows. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected frame. There may be a pre-defined set of representation formats of the projected picture, including for example an equirectangular projection (ERP) format and a cube map projection (CMP) format. It may be considered that the projected picture covers the entire sphere.

Optionally, region-wise packing is then applied to map the projected picture onto a packed picture. If the region-wise packing is not applied, the packed picture is identical to the projected picture, and this picture is given as input to image/video encoding. Otherwise, regions of the projected picture are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

In the case of stereoscopic 360-degree video, the input images of one time instance are stitched to generate a projected picture representing two views, one for each eye. Both views can be mapped onto the same packed picture, as described below in relation to the FIG. 6b, and encoded by a traditional 2D video encoder. Alternatively, each view of the projected picture can be mapped to its own packed picture, in which case the image stitching, projection, and region-wise packing is like described above with the FIG. 6a. A sequence of packed pictures of either the left view or the right view can be independently coded or, when using a multiview video encoder, predicted from the other view.

Figure 6B:
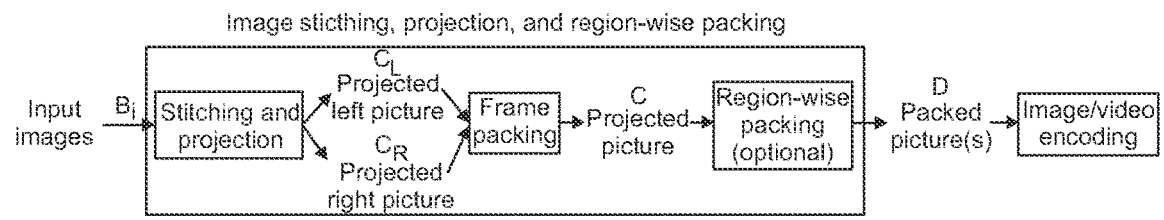

The breakdown of image stitching, projection, and region-wise packing process for stereoscopic content where both views are mapped onto the same packed picture is illustrated with the FIG. 6b and described as follows. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 7:
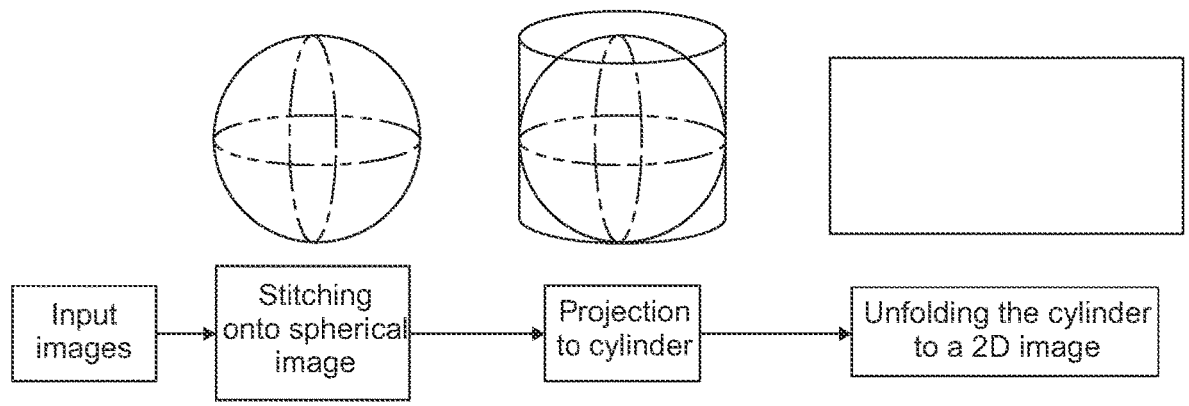
FIG. 7 shows a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that can be mapped to a bounding cylinder that can be cut vertically to form a 2D picture (this type of projection is known as equirectangular projection). The process of forming a monoscopic equirectangular panorama picture is illustrated in FIG. 7. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of panoramic projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of panoramic projection format.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

Among others, region-wise packing provides signalling for the following usage scenarios:
  Additional compression for viewport-independent projections is achieved by densifying sampling of different regions to achieve more uniformity across the sphere. For example, the top and bottom parts of ERP are oversampled, and region-wise packing can be applied to down-sample them horizontally.
  Arranging the faces of plane-based projection formats, such as cube map projection, in an adaptive manner.
  Generating viewport-dependent bitstreams that use viewport-independent projection formats. For example, regions of ERP or faces of CMP can have different sampling densities and the underlying projection structure can have different orientations.
  Indicating regions of the packed pictures represented by an extractor track. This is needed when an extractor track collects tiles from bitstreams of different resolutions.

OMAF allows the omission of image stitching, projection, and region-wise packing and encode the image/video data in their captured format. In this case, images D are considered the same as images Bi and a limited number of fisheye images per time instance are encoded.

For audio, the stitching process is not needed, since the captured signals are inherently immersive and omnidirectional.

The stitched images (D) are encoded as coded images (Ei) or a coded video bitstream (Ev). The captured audio (Ba) is encoded as an audio bitstream (Ea). The coded images, video, and/or audio are then composed into a media file for file playback (F) or a sequence of an initialization segment and media segments for streaming (Fs), according to a particular media container file format. In this specification, the media container file format is the ISO base media file format. The file encapsulator also includes metadata into the file or the segments, such as projection and region-wise packing information assisting in rendering the decoded packed pictures.

The metadata in the file may include:
  the projection format of the projected picture,
  fisheye video parameters,
  the area of the spherical surface covered by the packed picture,
  the orientation of the projection structure corresponding to the projected picture relative to the global coordinate axes,
  region-wise packing information, and
  region-wise quality ranking (optional).

The segments Fs are delivered using a delivery mechanism to a player.

The file that the file encapsulator outputs (F) is identical to the file that the file decapsulator inputs (F'). A file decapsulator processes the file (F') or the received segments (F's) and extracts the coded bitstreams (E'a, E'v, and/or E'i) and parses the metadata. The audio, video, and/or images are then decoded into decoded signals (B'a for audio, and D' for images/video). The decoded packed pictures (D') are projected onto the screen of a head-mounted display or any other display device based on the current viewing orientation or viewport and the projection, spherical coverage, projection structure orientation, and region-wise packing metadata parsed from the file. Likewise, decoded audio (B'a) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used the video and audio decoders for decoding optimization.

The process described above is applicable to both live and on-demand use cases.

The human eyes are not capable of viewing the whole 360 degrees space, but are limited to a maximum horizontal and vertical FoVs (HHFoV, HVFoV). Also, a HMD device has technical limitations that allow only viewing a subset of the whole 360 degrees space in horizontal and vertical directions (DHFoV, DVFoV)).

At any point of time, a video rendered by an application on a HMD renders a portion of the 360 degrees video. This portion is defined here as viewport. A viewport is a window on the 360 world represented in the omnidirectional video displayed via a rendering display. A viewport may alternatively be defined as a region of omnidirectional image or video suitable for display and viewing by the user.

A viewport size may correspond to the field of view of the HMD or may have a smaller size, depending on the application. For the sake of clarity, we define as primary viewport the part of the 360 degrees space viewed by a user at any given point of time.

Figure 8:
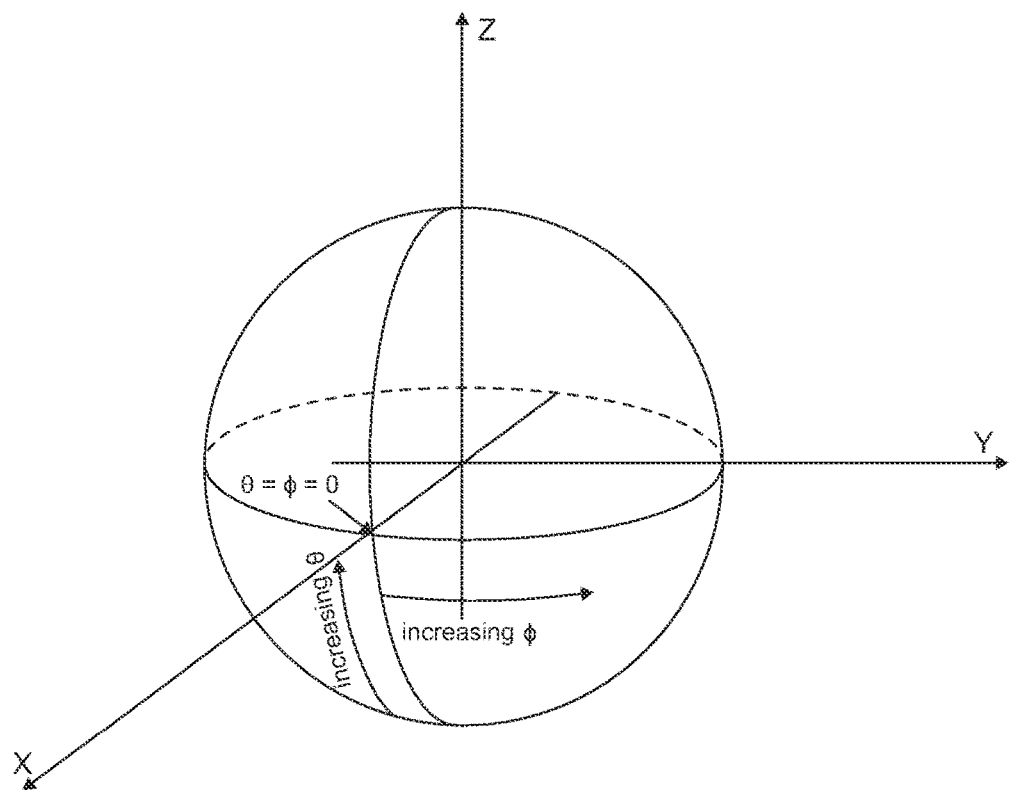
FIG. 8 shows an example of OMAF's coordinate system.

The coordinate system of OMAF consists of a unit sphere and three coordinate axes, namely the X (back-to-front) axis, the Y (lateral, side-to-side) axis, and the Z (vertical, up) axis, where the three axes cross at the centre of the sphere. The location of a point on the sphere is identified by a pair of sphere coordinates azimuth (φ) and elevation (θ). FIG. 8 specifies the relation of the sphere coordinates azimuth (φ) and elevation (θ) to the X, Y, and Z coordinate axes.

A viewing orientation may be defined as triplet of azimuth, elevation, and tilt angle characterizing the orientation that a user is consuming the audio-visual content; in case of image or video, characterizing the orientation of the viewport.

Figure 9:
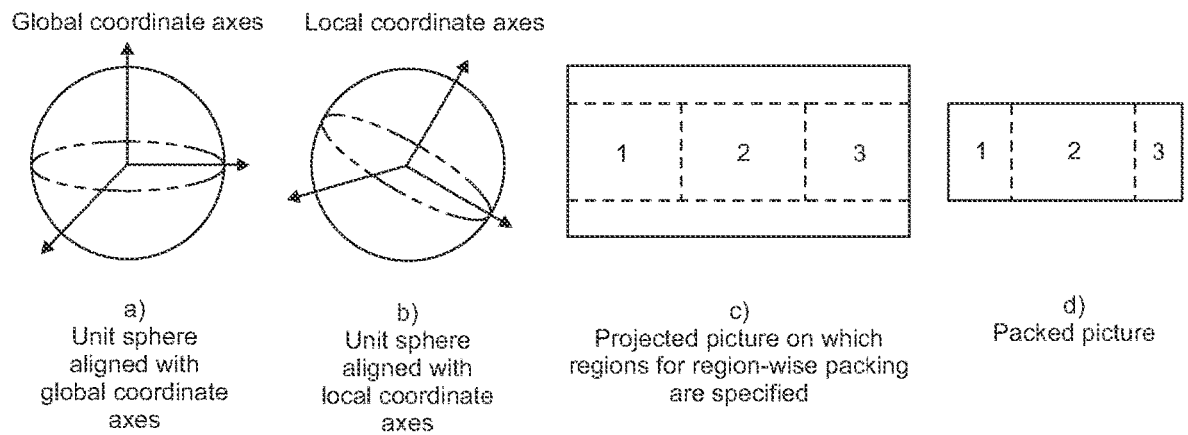
FIG. 9 shows an example of converting a spherical picture into a packed 2D picture.

FIG. 9 illustrates the conversions from a spherical picture to a packed picture that could be used in content authoring and the corresponding conversions from a packed picture to a spherical picture to be rendered that could be used in an OMAF player. The example in this clause is described for a packed picture that appears in a projected omnidirectional video track. Similar description could be derived for an image item.

The content authoring could include the following ordered steps:

- The source images provided as input are stitched to generate a sphere picture on the unit sphere per the global coordinate axes as indicated in a).
- The unit sphere is then rotated relative to the global coordinate axes, as indicated in b). The amount of rotation to convert from the local coordinate axes to the global coordinate axes is specified by the rotation angles indicated in the RotationBox. The local coordinate axes of the unit sphere are the axes of the coordinate system that has been rotated. The absence of RotationBox indicates that the local coordinate axes are the same as the global coordinate axes.
- As illustrated in c), the spherical picture on the rotated unit sphere is then converted to a two-dimensional projected picture, for example using the equirectangular projection. When spatial packing of stereoscopic content is applied, two spherical pictures for the two views are converted to two constituent pictures, after which frame packing is applied to pack the two constituent pictures to one projected picture.
- Rectangular region-wise packing could be applied to obtain a packed picture from the projected picture. One example of packing is depicted in c) and d). The dashed rectangles in c) indicate the projected regions on a projected picture, and the respective areas in d) indicate the corresponding packed regions. In this example, projected regions 1 and 3 are horizontally downsampled, while projected region 2 is kept at its original resolution.

CoverageInformationBox could be used to indicate content coverage, i.e., which part of the sphere is covered by the packed picture.

In order to map sample locations of a packed picture, such as that in d), to a unit sphere used in rendering illustrated in a), the OMAF player could perform the following ordered steps:

- A packed picture, such as that in d), is obtained as a result of decoding a picture from a video track or an image item.
- If needed, chroma sample arrays of the packed picture are upsampled to the resolution of the luma sample array of the packed picture, and colour space conversion could also be performed.
- If region-wise packing is indicated, the sample locations of the packed picture are converted to sample locations of the respective projected picture, such as that in c). Otherwise, the projected picture is identical to the packed picture.
- If spatial frame packing of the projected picture is indicated, the sample locations of the projected picture are converted to sample locations of the respective constituent picture of the projected picture. Otherwise, the constituent picture of the projected picture is identical to the projected picture.
- The sample locations of a constituent picture the projected picture are converted to sphere coordinates that are relative to local coordinate axes, as specified for the omnidirectional projection format being used. The resulting sample locations correspond to a sphere picture depicted in b).
- If rotation is indicated, the sphere coordinates relative to the local coordinate axes are converted to sphere coordinates relative to the global coordinate axes. Otherwise, the global coordinate axes are identical to the local coordinate axes.

For signaling the metadata of tile or sub-picture tracks or alike, any known method may be used. For example, a region-wise packing box and/or a 2D or spherical region-wise quality ranking box may be present for each tile or sub-picture track of 360° video. In another example, metadata may be present for each tile or sub-picture track of volumetric video.

Region-wise quality ranking metadata may be present in or along a video or image bitstream. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'.

The bytes of a resolved extractor are one of the following:
a) One entire NAL unit; note that when an Aggregator is referenced, both the included and referenced bytes are copied
b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

The following syntax may be used:
class aligned(8) Extractor ( ) {
  NALUnitHeader( );
  do {
    unsigned int(8) constructor_type;
    if(constructor_type==0)
      SampleConstructor( );
    else if(constructor_type==2)
      InlineConstructor( );
  } while(!EndOfNALUnit( ))
}

The semantics may be defined as follows:
NALUnitHeader( ): The first two bytes of HEVC NAL units. A particular nal_unit_type value indicates an extractor, e.g. nal_unit_type equal to 49.
constructor_type specifies the constructor being used.
EndOfNALUnit( ) is a function that returns 0 (false) when more data follows in this extractor; otherwise it returns 1 (true).

The sample constructor (SampleConstructor) may have the following syntax:
class aligned(8) SampleConstructor ( ) {
  unsigned int(8) track_ref_index;
  signed int(8) sample_offset;
  unsigned int((lengthSizeMinusOne+1)*8) data_offset;
  unsigned int((lengthSizeMinusOne+1)*8) data_length;
} track_ref_index identifies the source track from which data is extracted. track_ref_index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample−1 (minus 1) is the previous sample, and so on.

data_offset: The offset of the first byte within the reference sample to copy. If the extraction starts with the first byte of data in that sample, the offset takes the value 0.

data_length: The number of bytes to copy.

The syntax of the in-line constructor may be specified as follows:
class aligned(8) InlineConstructor ( ) {
  unsigned int(8) length;
  unsigned int(8) inline data[length];
} length: the number of bytes that belong to the InlineConstructor following this field.

inline data: the data bytes to be returned when resolving the in-line constructor.

A tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the time-aligned samples of the tracks indicated by the 'sabt' track reference in the order of the track references. It can therefore be understood that a tile base track includes coded video data of the referenced tile tracks by reference.

A sub-picture may be defined as a picture that represents a spatial subset of the original video content, which has been split into spatial subsets before video encoding at the content production side. A sub-picture bitstream may be defined as a bitstream that represents a spatial subset of the original video content, which has been split into spatial subsets before video encoding at the content production side. A sub-picture track may be defined as a track that is with spatial relationships to other track(s) originating from the same original video content and that represents a sub-picture bitstream. A sub-picture track conforms to the a conventional track format, such as 'hvc1' or 'hev1' defined for HEVC in ISO/IEC 14496-15. In an approach to generate sub-picture tracks, a source picture sequence is split into sub-picture sequences before encoding. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, an MCTS sequence is extracted from the bitstream, and a sub-picture track is generated by converting the MCTS sequence into a conforming bitstream e.g. through slice header modifications and encapsulating the generated bitstream into a track. Sub-picture tracks generated this way comprise motion-constrained pictures.

A collector track may be defined as a track that extracts implicitly or explicitly MCTSs or sub-pictures from other tracks. When resolved by a file reader, a collector track may represent a bitstream conforming to a video codec specification, such a HEVC or H.266/VVC. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

To avoid creating an excessive number of extractor tracks (e.g., to avoid creating an extractor track for each combination of high-resolution and low-resolution tiles), tracks that are alternatives for extraction may be grouped with a mechanism described in the following. Likewise, to enable the use of the same tile base track for collocated tile tracks representing different bitrate versions of the same content, the following mechanism may be used.

A file writer indicates in a file that a track group, e.g. referred to as 'alte' track group, contains tracks that are alternatives to be used as a source for extraction.

The identifier for the 'alte' group may be taken from the same numbering space as the identifier for tracks. In other words, the identifier for the 'alte' group may be required to differ from all the track identifier values. Consequently, the 'alte' track group identifier may be used in places where track identifier is conventionally used. Specifically, the 'alte' track group identifier may be used as a track reference indicating the source for extraction.

Members of the track group formed by this box are alternatives to be used as a source for extraction. Members of the track group with track group type equal to 'alte' are alternatives to be used as a source for 'scal' or 'sabt' track reference. A TrackReferenceTypeBox of reference_type equal to track_ref_4cc may list the track group id value(s) of an 'alte' track group(s) of containing the same alte track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. The source track for extraction may be changed at a position where the track switched to has a sync sample or a SAP sample of type 1 or 2.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)—Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Streaming systems similar to MPEG-DASH include for example HTTP Live Streaming (a.k.a. HLS), specified in the IETF RFC 8216. For a detailed description of said adaptive streaming system, all providing examples of a video streaming system, wherein the embodiments may be implemented, a reference is made to the above standard documents. The aspects of the invention are not limited to the above standard documents but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

As explained above, DASH and other similar streaming systems provide a protocol and/or formats for multimedia streaming applications. A recent trend in streaming in order to reduce the streaming bitrate of VR video may be referred to as viewport dependent delivery and it can be explained as follows: a subset of 360-degree video content covering the primary viewport (i.e., the current view orientation) is transmitted at the best quality/resolution, while the remaining of 360-degree video is transmitted at a lower quality/resolution.

Viewport-adaptive streaming may be realized through a tile-based encoding and streaming approaches. In these approaches, 360-degree content is encoded and made available in a manner that enables selective streaming of viewports from different encodings.

In viewport-specific encoding/packing, 360-degree image content is packed into the same frame with an emphasis (e.g. greater spatial area) on the primary viewport. Several versions of the content are created for different primary viewport orientations and/or FOVs. Viewport-specific encoding/packing may be achieved through asymmetric projection (a.k.a. viewport-dependent projection), wherein the viewport area is encoded in the highest sampling density, and the rest of the 360 scene is projected in a way that the sampling density is gradually decreasing from the viewport to non-viewport areas. The re-projected non-viewport area is packed into the same image plane as the viewport area. In a region-wise mixed quality approach, the viewport area is encoded with the highest picture quality, while the other areas are encoded with lower quality. In a region-wise mixed resolution approach, a viewport-independent projection is applied and the projected 2D picture is resampled region-wise prior to its encoding in a manner that the viewport originates from the highest 2D resolution and other areas originate from lower 2D resolutions.

In tile-based viewport-dependent streaming approaches, projected pictures are partitioned into tiles that are coded as motion-constrained tile sets (MCTSs). Tile-based viewport-adaptive streaming schemes can be categorized as follows:

Region-wise mixed quality (RWMQ) 360° video: Several versions of the content are encoded using MCTSs on the same tile grid, each version with different bitrate and picture quality. Players select on MCTS basis which version is received so that the quality of the MCTSs covering the viewport is higher than that of the other received MCTSs.
  Viewport+360° video: MCTSs for a complete low-resolution omnidirectional picture and high-resolution tiles covering the viewport are received.

Region-wise mixed resolution (RWMR) 360° video: Tiles are encoded at multiple resolutions. Players select a combination of high resolution tiles covering the viewport and low-resolution tiles for the remaining areas.

It is noted that all these approaches can be applied regardless of whether client-driven bitstream rewriting or extractor-driven sub-picture merging is in use. Further, in all these approaches, tiles (or their guard bands) may overlap by an amount selected in the pre-processing or encoding.

Figure 10:
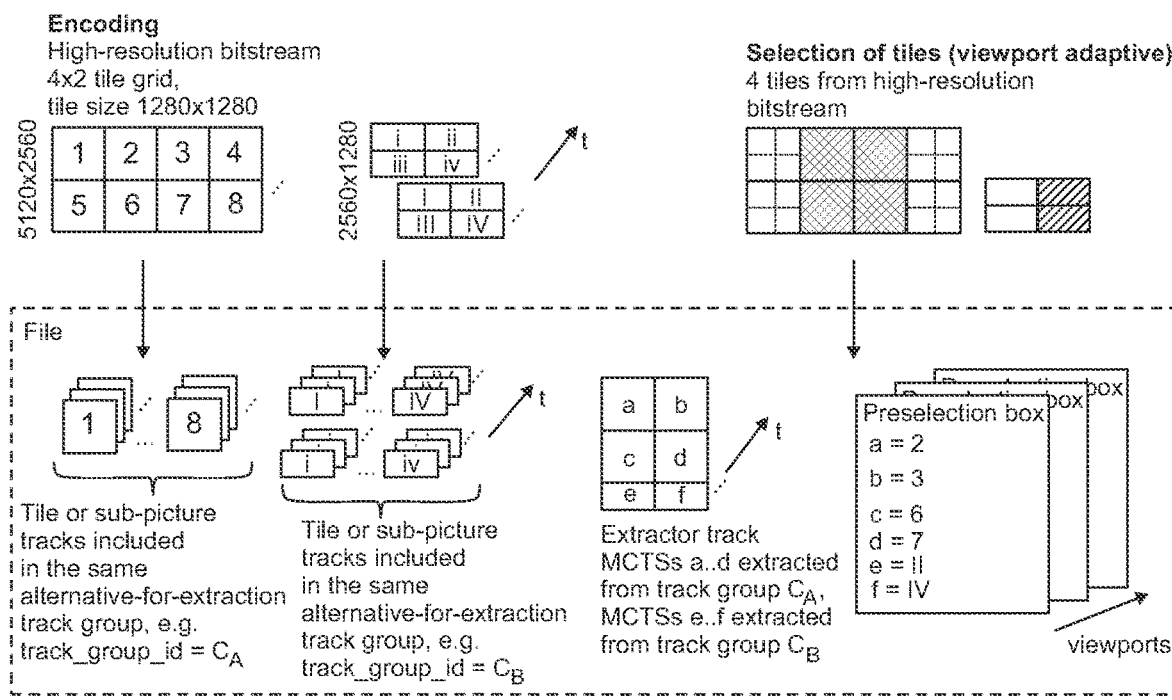
FIG. 10 shows an example scheme of multi-resolution tile merging.

An approach has been proposed to reduce the number of extractor tracks in resolution-adaptive viewport-dependent delivery or playback. The approach can be illustrated using an example scheme of multi-resolution tile merging depicted in FIG. 10.

The encoded bitstreams are stored as tile or sub-picture tracks in the file. A group of tile or sub-picture tracks that are alternatives for extraction is indicated. In one alternative-for-extraction group, the tiles or sub-picture tracks need not represent the same packed region but are of the same size in terms of width and height in pixels. The track group identifier is required to differ from all track identifiers. In the example case, two alternative-for-extraction groups are generated, a first one comprising 1280×1280 tiles from the high-resolution bitstream, and a second comprising 1280×640 tiles from the two low-resolution bitstreams.

An extractor track is created into the file. Extractors are set to refer to an alternative-for-extraction track group rather than individual tile or sub-picture tracks. A sample in this example comprises six extractors, here labeled a to f. Extractors a to d extract from the alternative-for-extraction track group comprising 1280×1280 tile or sub-picture tracks. Extractors e and f extract from the alternative-for-extraction track group comprising 1280×640 tile or sub-picture tracks.

Rather than storing the region-wise packing information in the extractor track, the region-wise packing information is split into two pieces, where a first piece excludes the packed region location and is stored in the tile or sub-picture tracks, and a second piece incudes the packed region location and is stored in the extractor track.

Omnidirectional video preselections are indicated, each defining a combination of tile or sub-picture tracks. Each preselection indicates from which individual sub-picture or tile track(s) data is extracted from. Characteristics of a preselection may be indicated, e.g. comprising the sphere region of a higher resolution (than other regions) and its effective resolution in terms of width and height of the projected picture that it originates from.

Conventionally, an extractor track is needed for each distinct combination to select high-resolution or high-quality tiles. In the approach, a single extractor track is needed, where each distinct combination to select high-resolution or high-quality tiles only requires an omnidirectional preselection box, thus the complexity of managing a large number of extractor tracks is avoided.

Nevertheless, tile-based viewport-dependent delivery of 360° video involves a great number of tile or sub-picture tracks, each containing a slice segment header for an independent slice segment. For example, 96 tiles resulting into 96 tile or sub-picture tracks may be used in a cube map projection format. Similarly, it is expected that for achieving point cloud or volumetric video streaming that adapts to viewing position and/or viewing orientation, a big number of tile or sub-picture tracks, each containing a set of patches, would be used.

The length of the independent slice segment header varies but is typically at least 4 bytes, resulting into about 184 kbps when 96 tiles are used, each being an independent slice segment, at 60 Hz picture rate. Slice segment header may be larger, particularly for tile tracks, since they contain the slice_segment_address syntax element for all other tiles than the very first tile of the picture in raster scan order. The bitrate caused by slice segment headers is therefore significant.

It has been proposed in MPEG M43397 that the length of slice segment headers is signalled in order to simplify the slice segment header rewriting process, which is used in late binding of viewport-dependent 360° video streaming. For example, a NAL-unit-like structure could be used for such signaling. The overhead of such approach includes indicating the length of the NAL-unit-like structure (configurable size, usually two bytes), the NAL unit header (two bytes), and the slice segment header length (one byte). Thus, a typical overhead is 5 bytes per slice segment header, corresponding to about 230 kbps for 96-tile 60-Hz content.

Late binding, in turn, requires at least partial parsing and rewriting of slice segment headers. Such parsing/rewriting is specific to HEVC syntax and needs resolving activation of and dependencies on parameter sets. Early binding may be defined as an author-driven or author-hinted process of tile or sub-picture selection and/or merging in a client. In OMAF, early binding may be implemented through extractor tracks, which assist in tile selection and provide instructions for merging of tiles to a bitstream to be decoded. Late binding may be defined as a client-derived selection and merging of tiles or sub-pictures in a client. Tile or sub-picture merging may be regarded as a process to combine coded tiles or sub-pictures without rewriting the slice segment payload(s).

OMAF media profiles for viewport-dependent streaming are based on extractors. Typically, one extractor per sub-picture track and per each time instance is used, each extractor typically having an overhead of about 15 bytes, corresponding to about 691 kbps for 96-tile 60-Hz content.

Now an improved method for content authoring is introduced in order to at least alleviate the above problems.

Figure 11:
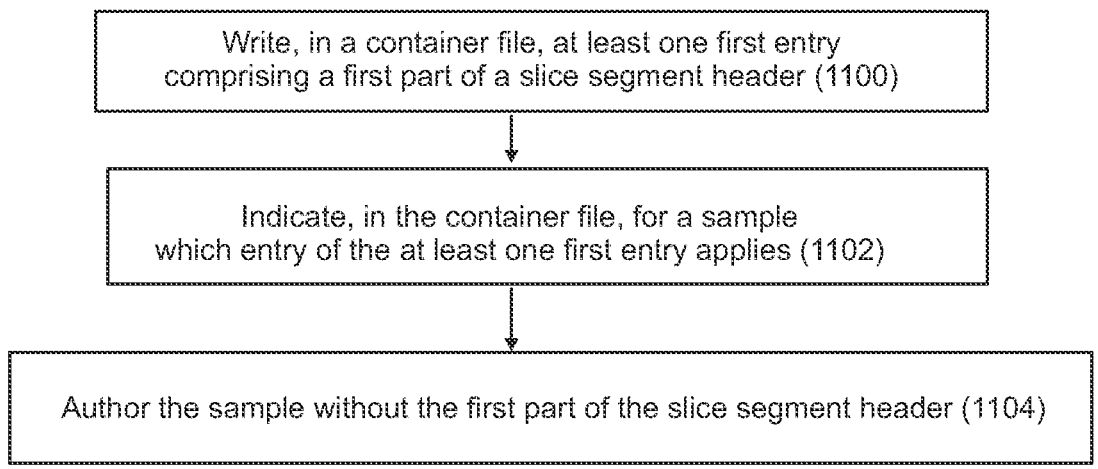
FIG. 11 shows a flow chart of an encoding/writing method according to an embodiment of the invention.

The method according to an aspect, as shown in FIG. 11, comprises writing (1100), in a container file, at least one first entry comprising a first part of a slice segment header; indicating (1102), in the container file, for a sample which entry of the at least one first entry applies; and authoring (1104) the sample without the first part of the slice segment header.

Thus, part(s) of slice segment headers are included as referenceable entries in a container file and included by reference in sample data for coded pictures. In the method, a first part of the slice segment header that remains unchanged in all (independent) slice segments of a coded picture is included as a referenceable entry in a first list of entries. A mapping indicative of an association of each sample with an indicated index among the first list of entries is provided, and the sample is authored without including the first part.

Figure 12:
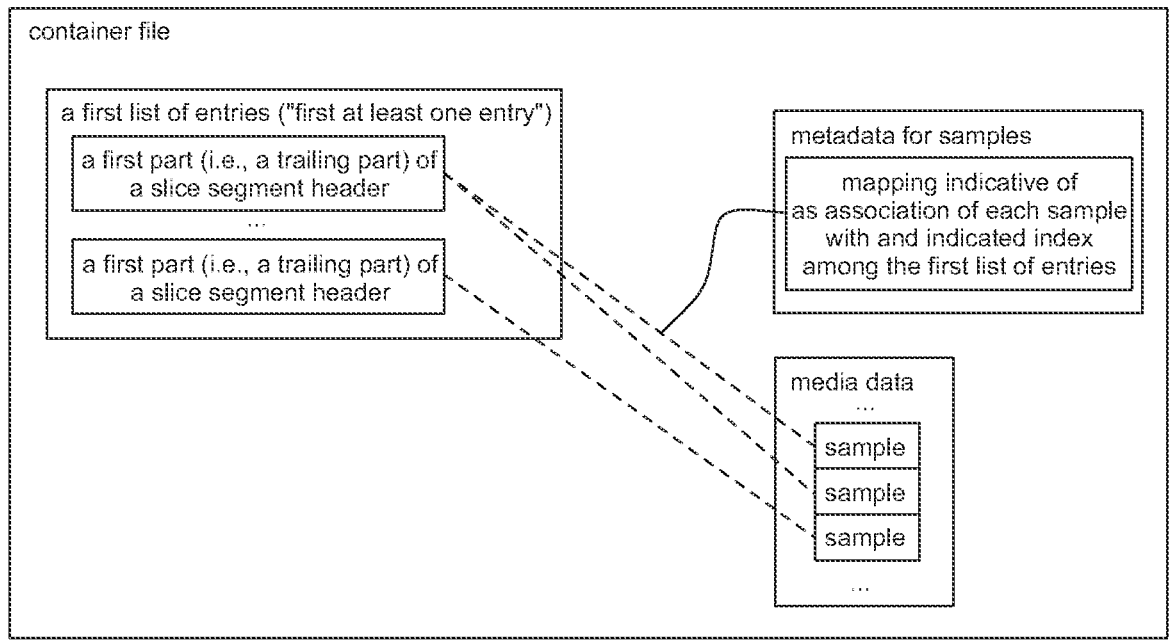
FIG. 12 shows an example of mapping in a container file according to an embodiment of the invention.

The mapping according to the method may be illustrated by the example of FIG. 12, where the first part of slice segment header remains unchanged in the first two samples, i.e. coded pictures comprising slice segment(s). Thus, instead of authoring both two samples with slice segments containing the first part of slice segment header, the container file is provided with metadata indicative of an association of each sample with an indicated index among the first list of entries. Due to the mapping, the samples can be authored without including the first part of slice segment header.

Thereby, the bitrate overhead caused by slice segment headers, signaling of slice segment header lengths, and extractors can be avoided. It is possible that several hundreds of kilobits/second or even more than a megabit/second can be saved for viewport-dependent 360° video streaming.

According to an embodiment, the method further comprises writing, in the container file, at least one second entry comprising a set of second parts of slice segment headers, wherein the second parts comprise different syntax elements than the first part; indicating, in the container file, for the sample which entry of the at least one second entry applies; and authoring the sample without the set of second parts of the slice segment headers.

Herein, second parts of the slice segment headers are included as a referenceable entry in a second list of entries, wherein the second part comprises syntax elements that may depend on the location of the slice segment within a picture, and the number of second parts may be equal to the number of (independent) slice segments in a picture. A mapping indicative of an association of each sample with an indicated index among the second list of entries is provided, and the sample is authored without including the second parts.

Figure 13:
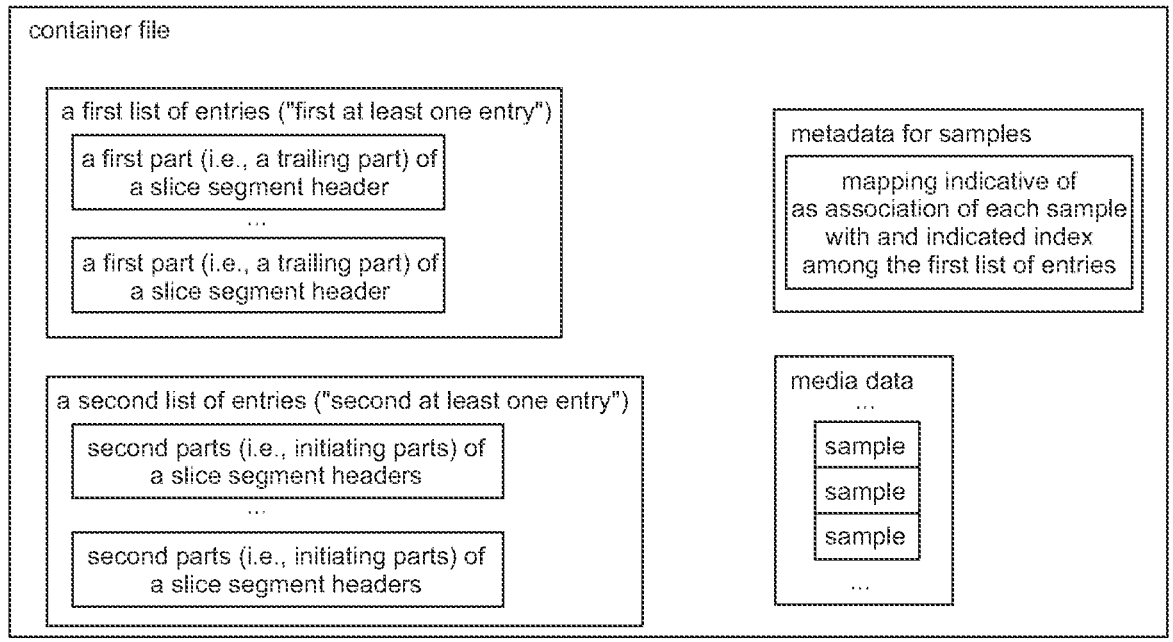
FIG. 13 shows an example of a container file structure according to an embodiment of the invention.

The mapping according to the embodiment may be illustrated by the example of FIG. 13, where the second part of slice segment header remains unchanged in a plurality of samples. FIG. 13 shows that the first parts of the slice segments headers relate to different syntax elements than the second parts of the slice segments headers. In this non-limiting example, the first parts refer to the trailing part of the slice segments headers, and the second parts refer to the initiating parts of the slice segments headers. However, the mapping to the metadata may be carried out similarly to the first parts, thereby enabling to author the samples without including the second parts of slice segment header.

According to an embodiment, the method further comprises writing in the container file a slice segment data track with samples comprising slice segment data without slice segment header; authoring the sample without slice segment data; and indicating, in the container file, that the slice segment data for the sample resides in the slice segment data track. A slice segment data track may be defined as a track whose samples comprise slice segment data and do not comprise slice segment headers. Some embodiment have been described with reference to the term sub-picture track or tile track. It needs to be understood that embodiments could likewise be realized with reference to the term slice segment data track instead of to the term sub-picture track or tile track.

Figure 14:
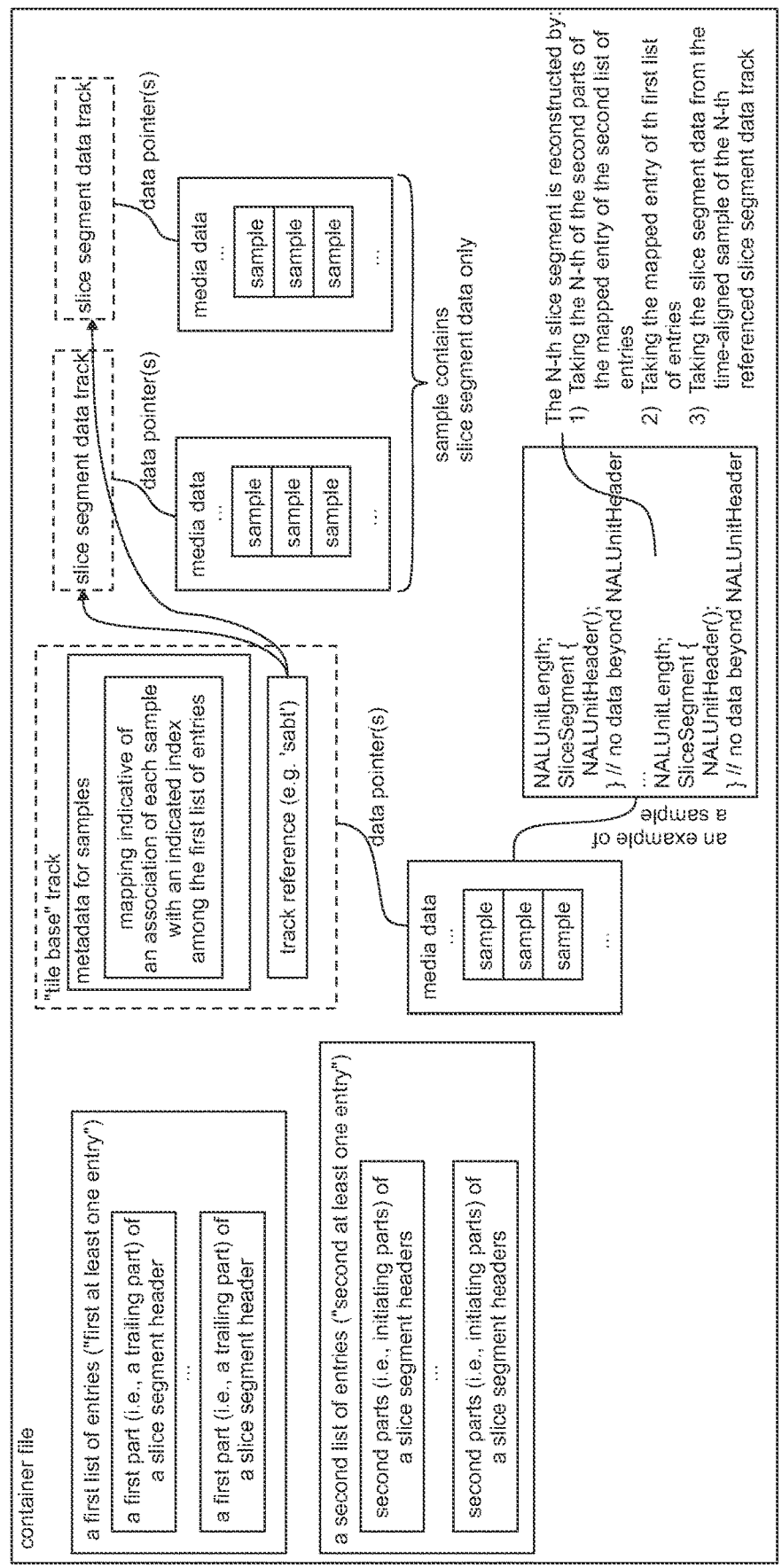
FIG. 14 shows another example of a container file structure according to an embodiment of the invention.

Accordingly, as shown in FIG. 14, slice segment data is included in samples of one or more slice segment data tracks, without slice segment headers. Slice segment data for a sequence of slice segments that have the same location and size across one or more coded video sequences may be included in a single slice segment data track. It is indicated, e.g. through track referencing, that slice segment data is included by reference into a coded picture (which may correspond to a sample in a tile base track).

FIG. 14 also shows an example of a sample structure of a track using any of the aspects above. The sample structure may comprise one or more slice segment NAL-unit-like structures. A slice segment NAL-unit-like structure may implicitly reference to an entry of the first list of entries and/or an entry of the second list of entries (for representing parts of the slice segment header), and may implicitly reference an associated sample in a slice segment data track (for representing slice segment data).

According to an embodiment, the container file may comply with the ISO base media file format.

According to an embodiment, the at least one first entry and/or the at least one second entry may be (but are not limited to) one of the following structures:

A sample group description box (i.e., SampleGroupDescriptionBox), or sample group description entry or entries within a sample group description box.

A new box, which may be contained e.g. in a MovieBox and/or in MovieFragmentBox(es), or syntax structure(s) or element(s) within the new box.

A timed metadata track, or metadata defined for the timed metadata track, such as a box in a sample entry of the timed metadata track.

Sample auxiliary information (for one or more samples).

codec_specific_parameters in a SubSampleInformationBox. A new value of the flags field may be specified to indicate that a sub-sample starts with or is treated as a slice segment NAL-unit-like structure. codec_specific_parameters may for example contain the initial part of the slice segment header, e.g. with a 5-bit length field (indicating the number of bits in the initial slice segment header part) and a maximum of 27 bits of slice segment header. In an embodiment, when a sub-sample is treated as a slice segment NAL-unit-like structure, it may use an original nal_unit_type of the VCL NAL unit, i.e. the sub-sample information indicates that NAL unit needs to be reconstructed by including the initial slice segment header part.

According to an embodiment, the first part of a slice segment header may comprise syntax elements that remain identical in all slice segment headers of independent slice segments of a coded picture.

According to an embodiment, the indication for a sample which entry of the at least one first entry applies and/or which entry of the at least one second entry applies may be (but is not limited to) one of the following:

When the same entry applies for an entire portion (e.g. an entire track fragment), a default entry index may be provided e.g. in SampleGroupDescriptionBox and hence applying to all samples that are not mapped otherwise to any entry A sample-to-group box (i.e, SampleToGroupBox) or alike (such as CompactSampleToGroupBox)

A new box, which may be contained e.g. in a SampleTableBox and/or in TrackFragmentBox(es).

A sample of a timed metadata track that is associated with a media sample e.g. by having the same decoding time or composition time as the media sample. The sample may for example provide a first index of which entry of the at least one first entry applies and/or a second index which entry of the at least one second entry applies, where the index(es) may for example refer to a box in a sample entry of the timed metadata track listing the at least one first entry and/or the at least one second entry.

When the same sample auxiliary information applies to multiple media samples, the same byte range that contains the at least one first entry and/or the at least one second entry may be indicated to be sample auxiliary information of more than one sample.

SubSampleInformationBox

According to an embodiment, the indication that the slice segment data for the sample resides in the slice segment data track may be (but is not limited to) one of the following:

A track reference of a particular type (e.g., TrackReferenceTypeBox with a particular reference_type value) to the slice segment data track (e.g., indicated by its track ID within the TrackReferenceTypeBox)

A track reference of a particular type to a track group comprising the slice segment data track.

According to an embodiment, at least one first entry comprising a first part of a slice segment header is included in a sample group description box of a particular type, and a sample-to-group box is included in the container file for indicating per sample which entry of the at least one first entry applies. The sample group may be for example referred to as the shared slice segment header ('sssh') sample group. Each sample group description entry of 'sssh' may be defined to contain a trailing part of the slice segment header that can be shared in multiple samples of a single track or across time-aligned samples. The trailing part may start from slice reserved flag[i], if any, or from slice type, otherwise. An example of syntax and semantics for the sample group description entry of the shared slice segment header is presented below with another embodiment.

According to an embodiment, at least one second entry comprising a set of second parts of slice segment headers, wherein the second parts comprise different syntax elements than the first part, is included in a sample group description box of a particular type, and a sample-to-group box is included in the container file for indicating per sample which entry of the at least second first entry applies. The sample group may be for example referred to the initial slice segment header part ('issh') sample group. Each sample group description entry of 'issh' may be defined to contain the initial parts of the slice segment headers of a picture, typically up to slice_segment_address, inclusive. Many times only very few sample group description entries are sufficient (e.g. one per picture type) and the sample grouping can be compacted efficiently e.g. using the compact sample-to-group box or alike. An example of syntax and semantics for the sample group description entry of the initial slice segment header part is presented below with another embodiment.

According to an embodiment, indicating, in the container file, which entry of the at least one first entry applies and/or which entry of the at least one second entry applies for a sample comprises including in the sample a slice segment NAL-unit-like structure. The slice segment header for a slice segment NAL-unit-like structure can be resolved from entry the indicated entry of at least one first entry and/or the indicated entry of the at least one second entry. For example, the sample may be associated with sample group description entries of the initial slice segment header part and shared slice segment header sample groups, and the slice segment header can be reconstructed. An example of syntax and semantics for the slice segment NAL-unit-like structure is presented below with another embodiment. In an embodiment, the slice segment NAL-unit-like structure contains the slice segment data (which may comprise the slice_segment_data( ) and the subsequent rbsp_slice_segment_trailing_bits( ) syntax structures in HEVC).

According to an embodiment, the method further comprises writing in the container file a slice segment data track with samples comprising slice segment data without slice segment header. The slice segment data track may use a particular sample entry type, such as but not limited to 'hvt2'. The method further comprises authoring a sample of a media track without slice segment data. The method further comprises indicating in the container file, that the slice segment data for the sample resides in the slice segment data track. In an embodiment, the indication (that the slice segment data for the sample resides in the slice segment data track) is performed by including a slice segment NAL-unit-like structure with an empty payload into the sample. In an embodiment, the indication is performed by indicating that the sample size is zero. In an embodiment, the indication is performed by including a particular syntax element value in a slice segment NAL-unit-like structure. The indication may also comprise or be accompanied with a track reference between the media track and the slice segment data track (e.g. from the media track to the slice segment data track).

According to an embodiment, the method comprises authoring a shared sample group track, which may be defined as a track that does not contain sample table or TrackRunBox and hence no samples. Shared sample group tracks are only used as container for sample group description entries and sample-to-group mappings. The shared slice segment header sample group is included in a shared sample group track and referenced by slice segment data tracks.

According to an embodiment, the following design may be used for sharing common parts of slice segment headers among sub-picture or tile tracks. This design enables sharing common parts of slice segment headers among multiple samples of the same track and among time-aligned samples of several tracks. It needs to be understood that individual ingredients of the embodiment may be implemented using a different mechanism and that box names and four-character codes are exemplary and other box names and four-character codes could likewise be used. The technical ingredients in all options include the following:

1. Initial slice segment header part ('issh') sample group: each sample group description entry contains the initial parts of the slice segment headers of a picture, typically up to slice_segment_address, inclusive. Many times only very few sample group description entries are sufficient (e.g. one per picture type) and the sample grouping can be compacted efficiently.
2. Shared slice segment header ('sssh') sample group: each sample group description entry contains a trailing part of the slice segment header that can be shared in multiple samples of a single track or across time-aligned samples. The trailing part typically starts from slice_reserved_flag[i], if any, or from slice type, otherwise.
3. Slice segment NAL-unit-like structure includes pieces of a slice_segment_layer_rbsp( ) syntax structure for an independent slice segment and a NAL unit header for the contained slice_segment_layer_rbsp( ) A complete slice_segment_layer_rbsp( ) or the respective VCL NAL unit can be reconstructed from the slice segment NAL-unit-like structure. The slice segment NAL-unit-like structure contains the following pieces:
   by reference to the 'issh' sample group: an initial part of the slice segment header;
   by reference to the 'sssh' sample group: a trailing part of the slice segment header;
   either natively or by reference to an 'hvt2' tile track: the slice_segment_data( ) and the subsequent rbsp_slice_segment_trailing_bits( )
4. 'hvc3' and 'hev3' sample entry types allowing the presence of slice segment NAL-unit-like structure in samples and requiring its processing in parsers. An 'hvc3'/'hev3' track is used as a tile base track including slice segment data by reference from samples of 'hvt2' tracks, which only contain the slice segment data (without slice segment header or NAL unit header). When the sample size is 0, the sample is reconstructed as if it only contained slice segment NAL unit like structures including slice segment data by reference from 'hvt2' tracks.

5. 'hvt2' tile tracks, which are like 'hvt1' tile tracks but with the difference that the sample format consists of one and only one instance of the syntax elements slice_segment_data( ) and rbsp_slice_segment_trailing_bits( ) of an independent slice segment.

The following syntax may be used:
Initial Slice Segment Header Sample Group
Syntax
aligned(8) class InitialSSHPart
extends VisualSampleGroupEntry('issh') {
unsigned int(6) orig_nal_unit_type;
unsigned int(10) num_ssh_minus1;
nextBitIdx=16;
for(i=0; i<=num_ssh_minus1; i++) {
  unsigned int(8) num_bits_issh_minus1[i];
  nextBitIdx+=8;
  for (j=0; j<=num_bits_issh_minus1[i]; j++, nextBitIdx++)
    unsigned int(1) issh_bit[i][j];
}
//byte alignment
if (nextBitIdx % 8) {
  bit(8−nextBitIdx % 8) reserved=0;
}

Semantics:
orig_nal_unit_type is the NAL unit type of the VCL NAL unit of the slice segment.

num_ssh_minus1 plus 1 specifies the number of slice segment headers in the mapped sample.

num_bits_issh_minus1[i] plus 1 specifies the number of bits in the initial part of the i-th slice segment header.

issh_bit[i][j] specifies the j-th bit of the slice_segment_header( ) of the i-th slice segment header.

Shared Slice Segment Header Sample Group
Syntax
aligned(8) class SharedSSH
extends VisualSampleGroupEntry('sssh') {
unsigned int(16) sssh_num_bits;
for (i=0; i<sssh_num_bits; i++)
  unsigned int(1) sssh_bit[i];
//byte alignment
if (sssh_num_bits % 8) {
  bit(8−sssh_num_bits % 8) reserved=0;
}

Semantics:
sssh_num_bits specifies the number of bits in the shared part of a slice segment header.

sssh_bit[i] specifies the i-th bit of the shared part of a slice segment header.

Slice Segment NAL-Unit-Like Structure

Slice segment NAL-unit-like structure includes a piece of a slice_segment_layer_rbsp( ) syntax structure for an independent slice segment. A complete slice_segment_layer_rbsp( ) or the respective VCL NAL unit can be reconstructed from the slice segment NAL-unit-like structure.

When no slice_segment_trailing_part[i] syntax elements are present (i.e., when NumBytesSSTrailingPart is equal to 0), the track shall contain a respective track reference of type 'sabt' to a track of type 'hvt2'.

Syntax
aligned(8) class SliceSegment {
NALUnitHeader( );
i=0;
do {
  unsigned int(8) slice_segment_trailing_part[i];
  i++;
} while(!EndOfNALUnit( ))
NumBytesSSTrailingPart=i;
}

Semantics:
NALUnitHeader( ) The first two bytes of ISO/IEC 23008-2 NAL units.

nal_unit_type shall be set to 50 for ISO/IEC 23008-2 video. forbidden zero bit shall be set as specified in ISO/IEC 23008-2. Other fields (nuh_layer_id and nuh_temporal_id_plus1) shall be set as they were set for the VCL NAL unit of the slice segment.

slice_segment_trailing_part[i] specifies the i-th byte in the trailing part of the slice_segment_layer_rbsp( ).

Reconstruction of a VCL NAL Unit from the Slice Segment NAL-Unit-Like Structure

In an embodiment, file parsing may comprise the following operation for reconstructing a VCL NAL unit from a slice segment NAL-unit-like structure. First, an RBSP is formed from a slice segment header and slice segment data, wherein the slice segment header is formed from the indicated initial slice segment header part, the indicated shared slice segment header part, and byte alignment when needed, and slice segment data is provided natively or by reference. A VCL NAL unit is formed from a provided and/or inferred NAL unit header (e.g. nal_unit_type) and the RBSP, and may involve insertion of start code emulation prevention bytes (unless there it is ensured by other means that start code emulations do not appear). With reference to the embodiment above, the following detailed process can be used. Given sshIdx that is a zero-based index of the slice segment NAL unit-like structure in appearance order within a sample, a slice_segment_layer_rbsp( ) syntax structure corresponding to the sshIdx-th slice segment NAL-unit-like structure in a sample is reconstructed with the following ordered steps 1. The RSBP is initially empty.
2. Include issh_bit[sshIdx][bitIdx] for bitIdx from 0 to num_bits_issh_minus1[sshIdx], inclusive, from the 'issh' sample group description entry mapped to the sample into the RBSP.
3. Append the RBSP with the sssh_bit[bitIdx] for bitIdx from 0 to sssh_num_bits−1, inclusive, from the 'sssh' sample group description entry mapped to the sample.
4. Append the RBSP with byte alignment( ) as specified in HEVC.
5. If NumBytesSSTrailingPart is greater than 0, append the RBSP with the array slice_segment_trailing_part[ ]. Otherwise, append the RBSP with the time-aligned sample of the (sshIdx+1)-th track reference of type 'sabt'.

A VCL NAL unit is reconstructed from the reconstructed slice_segment_layer_rbsp( ) syntax structure with the following ordered steps:

1. The VCL NAL unit is initially empty.
2. Construct the NAL unit header from NALUnit Header( ) of the NAL-unit-like-structure by replacing nal_unit_type with orig_nal_unit_type from the 'issh' sample group description entry mapped to the sample and include it into the VCL NAL unit.
3. Repetitively append the VCL NAL unit by bytes of the RBSP or the emulation_prevention_three_byte syntax element as specified in clause 7.3.1.1 of HEVC.

According to another embodiment, a sample group may be defined and used for indicating slice segment header length. As a consequence of using sample groups the sample data itself remains unchanged. Thus, the authoring process for creating the sample groups is simple, particularly when the slice segment length data is appended onto an existing ISOBMFF file.

According to yet another embodiment for sharing common parts of slice segment headers among multiple samples of the same track, common parts of slice segment headers may be shared among sub-picture or tile tracks. Since the bitrate overhead caused by repetitive slice segment headers for sub-picture or tile tracks is considerable, sharing of the common parts of slice segment headers reduces the overhead significantly. In such a design, the length of slice segment headers also becomes explicitly exposed, hence enabling shortcuts in slice segment header rewriting.

All the embodiments regarding sharing common parts of slice segment headers among multiple samples of the same track, as disclosed herein, enable to avoid the bitrate overhead caused by slice segment headers, signaling of slice segment header lengths, and extractors. Moreover, they enable to infer the slice segment header length for easy slice segment header rewriting. They also enable tile merging through instructions, while at time same time enabling client-driven selection which tile or sub-picture tracks are merged, and thus avoiding an HEVC-syntax-specific slice header rewriting process.

Figure 15:
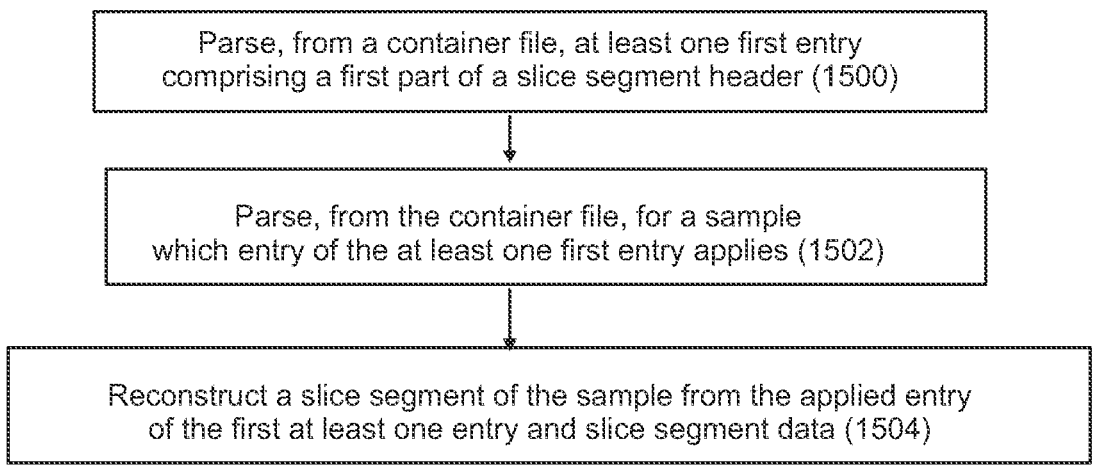
FIG. 15 shows a flow chart of a decoding/parsing method according to an embodiment of the invention.

Another aspect of the invention relates to the operation of a parser or a client. The operation may include, as shown in FIG. 15, parsing (1500), from a container file, at least one first entry comprising a first part of a slice segment header; parsing (1502), from the container file, for a sample which entry of the at least one first entry applies; and reconstructing (1504) a slice segment of the sample from the applied entry of the first at least one entry and slice segment data.

According to an embodiment, the method further comprises parsing, from the container file, at least one second entry comprising a set of second parts of a slice segment header, wherein the second part comprises different syntax elements than the first part; parsing, from the container file, for the sample which entry of the at least one second entry applies; and reconstructing the slice segment also from the applied entry of the at least one second entry.

According to an embodiment, the method further comprises parsing, from the container file, that the slice segment data for the sample resides in a slice segment data track with samples comprising slice segment data without slice segment header; reading, from the container file, a time-aligned sample of the slice segment data track; and reconstructing the slice segment on the basis of the slice segment data carried in the time-aligned sample.

According to an embodiment, for enabling the HEVC-specific late binding mechanism, the encoding is preferably configured to result into independent slice segments that have the same width W and the same height H. It is noted that W needs not be equal to H. The embodiment may be considered to combine early and late binding approaches; tile or sub-picture selection may be client-driven, whereas merging of tiles or sub-pictures is performed as instructed by the content author. Consequently, the client operation does not need to contain slice segment header parsing and rewriting but can be implemented only by following instructions given by the content author. The instructions may comprise slice segment NAL-unit-like structures as described in other embodiments.

Figure 16:
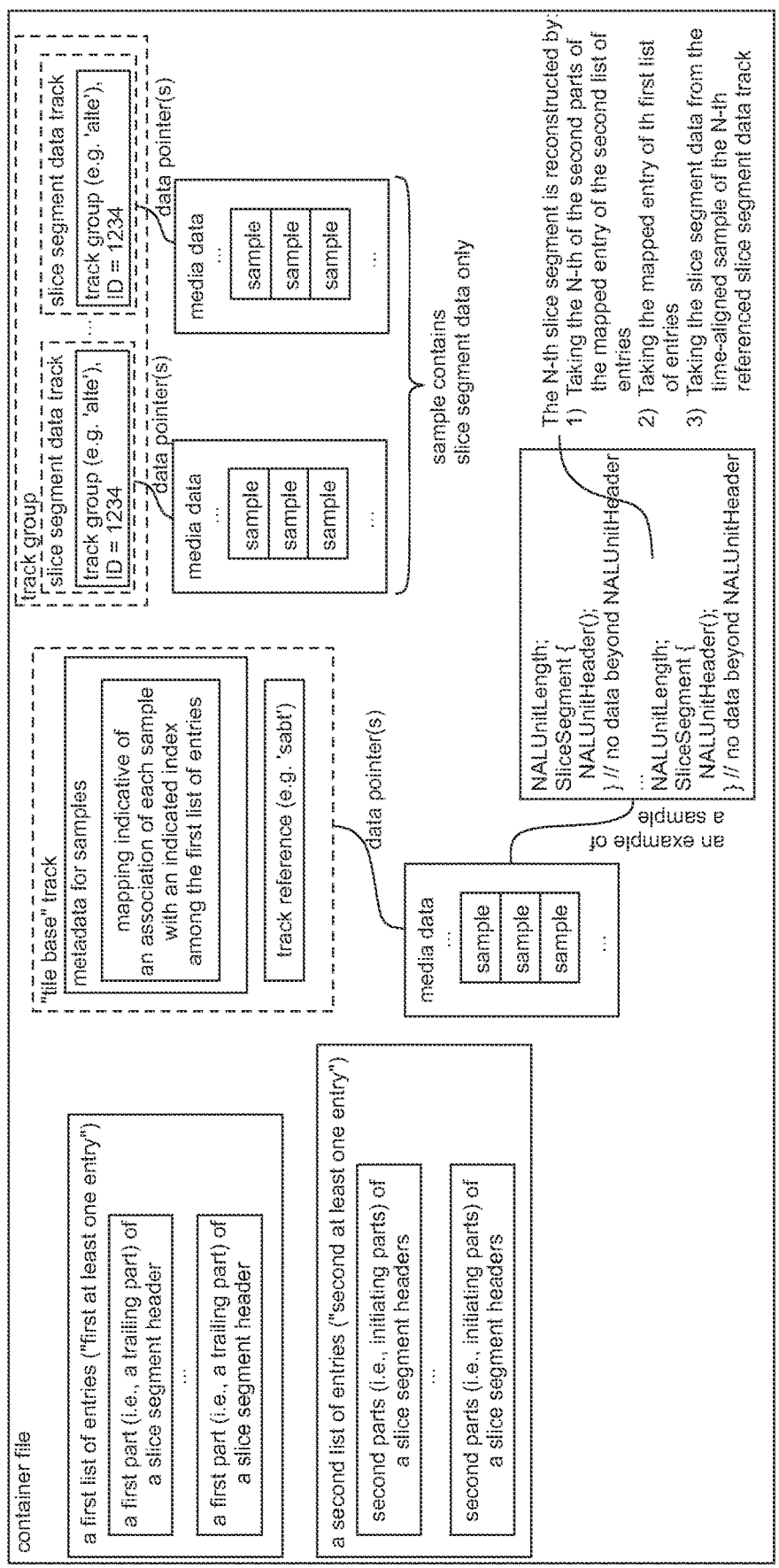
FIG. 16 shows an example of a container file structure for late binding according to an embodiment of the invention.

Herein, writer operation resulting in a file structure according to FIG. 16 may be used. In the writer, each sequence of independent slice segments is encapsulated as a tile track (e.g. of type 'hvt2'). Samples of the tile track contain only the slice segment data, i.e. slice segment headers are excluded. The tile tracks are indicated to belong to the same track group (e.g., of type 'alte'), which may be regarded as an alternative-for-extraction group as discussed earlier. A tile base track e.g. of type ('hvc3' or 'hev3') is created and each sample of the tile base track contains or is inferred to contain N slice segment NAL-unit-like structures. The tile base track results into coded pictures with N independent slice segments, where the value N may differ between tile base tracks. Several tile base tracks may be created, e.g. for each envisioned decoding capacity. Any track selected by a file parser or player among a track group (e.g., of type 'alte') is indicated to be suitable as a source for obtaining slice segment data for a slice segment NAL-unit-like structure with any of the embodiments described in the following paragraphs.

In an embodiment, the tile base track contains a list of track references (e.g. of type 'sabt') to the track group (e.g. of type 'alte'), thus indicating that a parser may select any track from the track group for as a source for slice segment data for each independent slice segment. TrackReferenceTypeBox is allowed to contain the same ID value (referencing to the track group) multiple times. The m-th ID value in the TrackReferenceTypeBox (e.g. of type 'sabt') is associated with the m-th NAL-unit-like structure of a sample.

In another embodiment, several track groups that may contain the same tracks are defined, and TrackReferenceTypeBox is not allowed to contain the same ID value more than once. The tile base track contains a list of track references (e.g. of type 'sabt'), each referencing to a different track group (e.g. of type 'alte'). The track groups may, however, contain the same tracks (e.g. of type 'hvt2'). The m-th ID value in the TrackReferenceTypeBox (e.g. of type 'sabt') is associated with the m-th NAL-unit-like structure of a sample.

In another embodiment, a particular track reference type (e.g. of type 'altt') is used to indicate that the same ID value is used in resolving all slice segment NAL-unit-like structures but when an ID value references a track group, the track among the track group may be selected differently each time. In this case the tile base track includes a TrackReferenceTypeBox (e.g. of type 'altt') containing one ID value, which references a track group.

In another embodiment, a particular track reference type (e.g. of type 'altt') is used to indicate that the ID values in the TrackReferenceTypeBox are used cyclically in resolving slice segment NAL-unit-like structures. If several IDs are listed in the TrackReferenceTypeBox, they are cyclically assigned to the slice segment NAL-unit-like structures.

In another embodiment, each listed ID for a particular track reference type (e.g. of type 'altt') may be indexed (implicitly) and a sample group may provide a mapping of slice segment NAL-unit-like structures to an index of an ID of the track reference. This way, IDs of the same value need not be repeated in the TrackReferenceTypeBox and IDs pointing to tracks or track groups of different slice segment header sizes (e.g. different tile sizes) can be used. The sample group containing the index (in its sample group description entry) may be separate from or the same as the initial slice segment header part sample group or alike. An example of extending the sample group description entry of the initial slice segment header part sample group is presented below. The slice segment data for the i-th slice segment is obtained from a track identified by the track_ref_index-th ID value (among track_IDs[ ]) of the TrackReferenceTypeBox (e.g. of type 'altt'). If the ID value points to a track group (e.g. of type 'alte'), any track among the track group may be selected as a source for obtaining the slice segment data. It may be defined that track_ref_index is a 1-based index and that track_ref_index equal to 0 may be used when the slice segment data is included natively in the slice segment NAL-unit-like structure. Other syntax elements of the sample group description entry may be defined as described with an earlier embodiment.

```
aligned(8) class InitialSSHPart
extends VisualSampleGroupEntry('issh') {
    unsigned int(6) orig_nal_unit_type;
    unsigned int(10) num_ssh_minus1;
    nextBitIdx=16;
    for(i=0; i<=num_ssh_minus1; i++) {
        unsigned int(32) track_ref_idx;
        unsigned int(8) num_bits_issh_minus1[i];
        nextBitIdx+=8;
        for (j=0; j<=num_bits_issh_minus1[i]; j++, next-
            BitIdx++)
            unsigned int(1) issh_bit[i][j];
    }
    //byte alignment
    if (nextBitIdx % 8) {
        bit(8−nextBitIdx % 8) reserved=0;
}
```

In an embodiment, a sample of a tile base track ('hvc3' or 'hev3') is inferred to contain N slice segment NAL-unit-like structures, when the sample size is indicated to be zero. When the sample size is 0 in a tile base track, it may be required that track references are used, as described in any embodiment above, for indicating suitable sources for obtaining slice segment data for the inferred slice segment NAL-unit-like structures. When the sample size is 0 in a tile base track, the bitstream corresponding to the sample is reconstructed by invoking a reconstruction process of a VCL NAL unit repeatedly as if the sample contained a number of slice segment NAL-unit-like structures with an empty payload, where the number (N) may be determined to be equal to the number of ID values in the TrackReferenceTypeBox (in some embodiments) or the number of list entries of the initial slice segment header entry mapped to the sample, e.g. num_ssh_minus1+1 (in some embodiments).

An 'hvc3' or 'hev3' tile base track referencing an alternative-for-extraction track group may not contain region-wise packing information (e.g. RegionWisePackingBox), since the mapping of packed regions may depend on client's selection of tracks that are marked as alternatives in an alternative-for-extraction track group. The tile or sub-picture tracks (e.g. 'hvt2' tracks or alike) included in an alternative-for-extraction track group may contain region-wise packing information (e.g. RegionWisePackingBox), which may be used to determine the semantics of sample locations in decoded pictures. In other words, the region-wise packing format of decoded pictures of an 'hvc3' or 'hev3' tile base track is indicated by the collection of the instances of RegionWisePackingBox within the sample entries of the tile or sub-picture tracks (or alike) that are selected among the referenced alternative-for-extraction track groups.

Regarding the player operation for late binding, the player selects a tile base track that has a suitable decoding capacity requirement. The player concludes how many independent slice segments the samples of the track contain. The player selects such tile tracks (from the track group) that cover the viewport (and a margin around the viewport) and that have higher resolution and/or quality than other selected tile tracks. For example, the region-wise quality ranking information can be used to conclude which tile tracks are suitable to cover the viewport and which ones are suitable for non-viewport areas. The player follows the reconstruction process for RBSPs (and NAL units, if needed) to reconstruct a coded picture.

Figure 17:
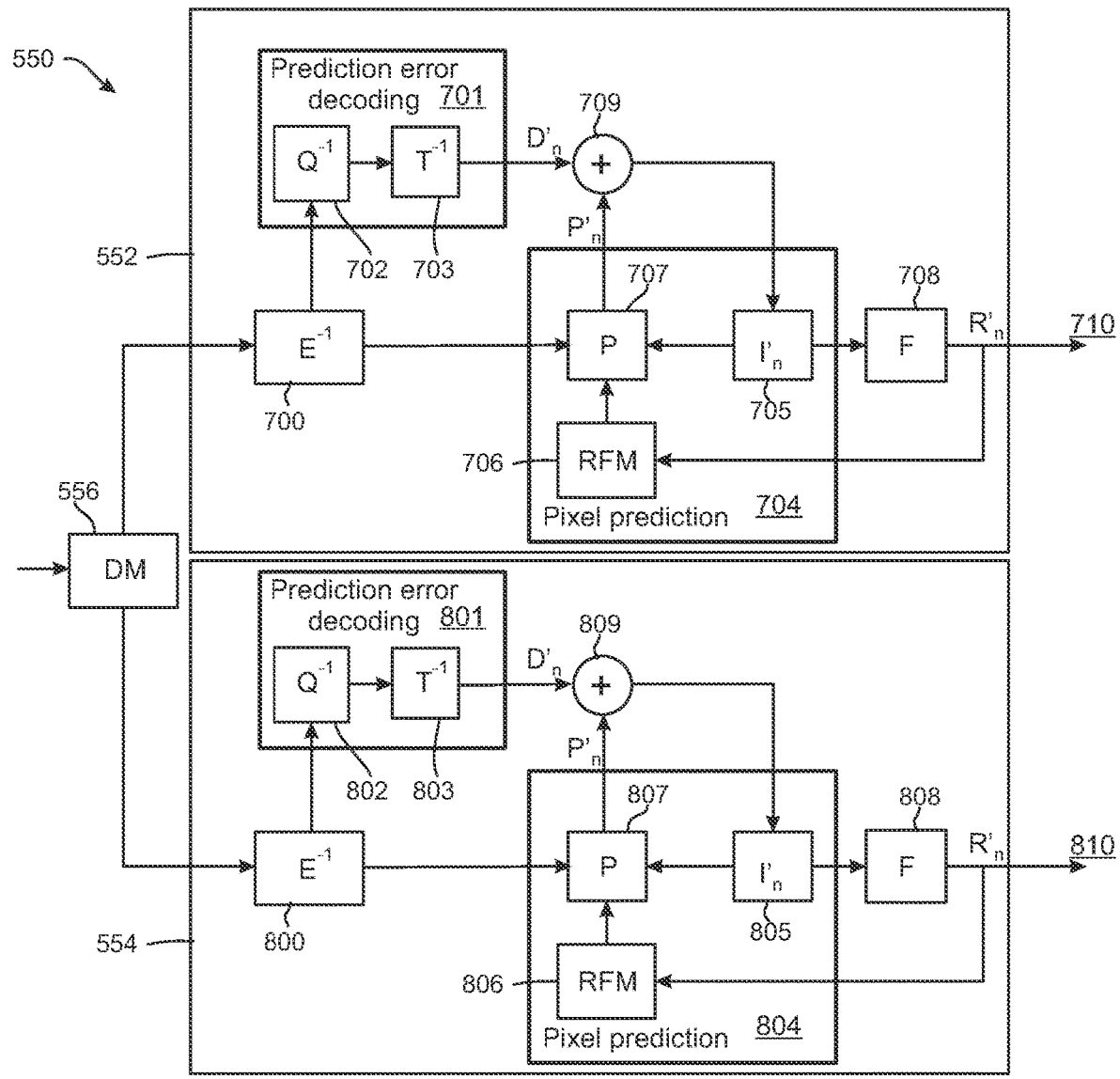
FIG. 17 shows a schematic diagram of a decoder suitable for implementing embodiments of the invention.

FIG. 17 shows a block diagram of a video decoder suitable for employing embodiments of the invention. FIG. 20 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 18:
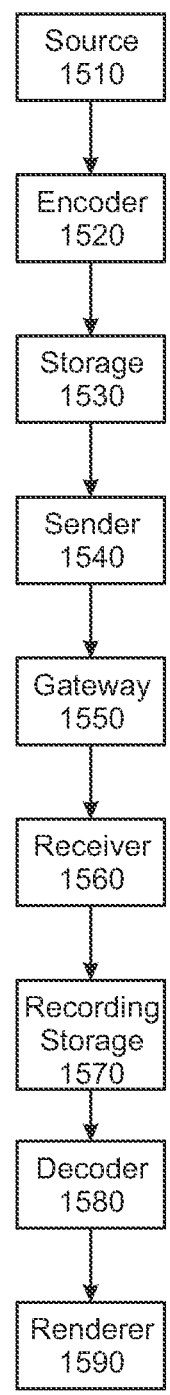
FIG. 18 shows a schematic diagram of an example multimedia communication system within which various embodiments may be implemented.

FIG. 18 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described in relation to a container file. It should be understood that embodiments equally apply to other types of containers than files. For example, embodiments apply to segments used in transmission, such as Segments as defined in MPEG-DASH. Likewise, embodiments apply to a set of segments, such as a sequence of an Initialization Segment followed by one or more Media Segments, as defined in MPEG-DASH.

In the above, some embodiments have been described in relation to a slice segment NAL-unit-like structure. It needs to be understood that embodiments equally apply when referencing to the first list of entries, the second list of entries, and/or the slice segment data is made through other means. For example, when a coded picture only contains VCL NAL units, the respective sample may be empty and the sample may be specified to contain N slice segments, where N is equal to the number of second parts in an associated entry of the second list of entries and/or the number of track references (e.g. of type 'sabt') to slice segment data tracks. The coded picture may be reconstructed similarly to as described with other embodiments.

In the above, some embodiments have been described in relation to HEVC and its syntax structures. It should be understood that embodiments equally apply to other codecs with similar concepts. Even though embodiments have been described in relation to slice segments and slice segment headers, they equally apply to any other types of picture partitions with headers.

In the above, some embodiments have been described with reference to terms tile track and tile base track. It needs to be understood that embodiments apply to other similar concepts and terms. For example, embodiments apply to sub-picture track or slice segment data track where tile track is referred. In another example, embodiments apply to collector track where tile base track is referred.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, where the example embodiments have been described with reference to file writing or authoring, it needs to be understood that the resulting container file and the file parsing may have corresponding elements in them. Likewise, where the example embodiments have been described with reference to file parsing, it needs to be understood that the file writer may have structure and/or computer program for generating the container file to be parsed by the file parser.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    encapsulating, in a container file, one or more slice segment data tracks of video data with samples comprising slice segment data without slice segment header as a tile track, wherein said slice segment data comprises a plurality of independent slice segments;
    indicating, in the container file using an indication, that a plurality of slice segment data tracks belong to a same track group; and
    writing, in the container file, one or more tile base tracks, wherein each sample of the tile base track contains or is inferred to contain one or more slice segment NAL (Network Abstraction Layer)—unit-like structures comprising a NAL unit header and NAL unit payload, said one or more tile base tracks containing a list of track references to at least one track group, wherein tracks of the plurality of slice segment data tracks of said same track group are alternatives to be selected as a source for extraction of the slice segment data.

2. The method according to claim 1, wherein the indication is included in a box defining a type of a track reference, wherein said box is allowed to contain a same reference value to the track group multiple times, wherein an order number of the same reference value is associated with a corresponding order number of the NAL-unit-like structure.

3. The method according to claim 1, wherein a plurality of track groups are defined and the indication is included in a box defining a type of a track reference, wherein said box is allowed to contain a same reference value to each of the plurality of track groups at most once.

4. The method according to claim 2, further comprising:
    indicating, by the type of the track reference, that the same reference value is used in resolving all slice segment NAL-unit-like structures, wherein when said reference value references a track group, and tracks among the track group are selectable differently each time.

5. The method according to claim 2, further comprising:
    indicating, by the type of the track reference, that reference values in the box defining the type of the track reference are used cyclically in resolving all slice segment NAL-unit-like structures.

6. The method according to claim 2, further comprising:
    indexing each reference value for a particular track reference type; and
    mapping, in a sample group, slice segment NAL-unit-like structures to an index of an reference value of the track reference.

7. An apparatus comprising at least one processor and at least one memory including computer program code for at least one or more programs, the at least one memory and the computer program code configured to, with the at least one processor, cause the apparatus at least to:
    encapsulate, in a container file, one or more slice segment data tracks of video data with samples comprising slice segment data without slice segment header as a tile track, wherein said slice segment data comprises a plurality of independent slice segments;
    indicate, in the container file using an indication, that a plurality of slice segment data tracks belong to a same track group; and
    write, in the container file, one or more tile base tracks, wherein each sample of the tile base track contains or is inferred to contain one or more slice segment NAL (Network Abstraction Layer)—unit-like structures comprising a NAL unit header and NAL unit payload, said one or more tile base tracks containing a list of track references to at least one track group, wherein tracks of the plurality of slice segment data tracks of said same track group are alternative to be selected as a source for extraction of the slice segment data.

8. The apparatus according to claim 7, wherein the indication is arranged to be included in a box defining a type of a track reference, wherein said box is allowed to contain a same reference value to the track group multiple times, wherein an order number of the same reference value is associated with a corresponding order number of the NAL-unit-like structure.

9. The apparatus according to claim 7, wherein a plurality of track groups are arranged to be defined and the indication is arranged to be included in a box defining a type of a track reference, wherein said box is allowed to contain a same reference value to each of the plurality of track groups at most once.

10. The apparatus according to claim 8, wherein the apparatus further caused to:
   indicate, by the type of the track reference, that the same reference value is used in resolving all slice segment NAL-unit-like structures, wherein when said reference value references a track group, and tracks among the track group is are selectable differently each time.

11. The apparatus according to claim 8, wherein the apparatus further caused to:
   indicate, by the type of the track reference, that reference values in the box defining the type of the track reference are used cyclically in resolving all slice segment NAL-unit-like structures.

12. The apparatus according to claim 8, wherein the apparatus further caused to:
   index each reference value for a particular track reference type; and
   map, in a sample group, slice segment NAL-unit-like structures to an index of an reference value of the track reference.

13. The apparatus according to claim 9, wherein the apparatus further caused to:
   indicate, by the type of the track reference, that the same reference value is used in resolving all slice segment NAL-unit-like structures, wherein when said reference value references a track group, and tracks among the track group are selectable differently each time.

14. A method comprising:
   parsing, from a container file, an indication about one or more slice segment data tracks of video data with samples comprising slice segment data without slice segment header and being encapsulated as a tile track, wherein said slice segment data comprises a plurality of independent slice segments;
   parsing, from the container file, an indication that a plurality of slice segment data tracks belong to a same track group;
   reading, from the container file, one or more tile base tracks, wherein each sample of the tile base track contains or is inferred to contain one or more slice segment NAL (Network Abstraction Layer)—unit-like structures comprising a NAL unit header and NAL unit payload, said one or more tile base tracks containing a list of track references to at least one track group, wherein tracks of a common track group are alternatives to be selected as a source for extraction of the slice segment data; and
   selecting one of said tile base tracks for reconstruction based on decoding capacity requirements.

15. An apparatus comprising at least one processor and at least one memory including computer program code for at least one or more programs, the at least one memory and the computer program code configured to, with the at least one processor, cause the apparatus at least to:
   parse, from a container file, an indication about one or more slice segment data tracks of video data with samples comprising slice segment data without slice segment header and being encapsulated as a tile track, wherein said slice segment data comprises a plurality of independent slice segments;
   parse, from the container file, an indication that a plurality of slice segment data tracks belong to a same track group;
   read, from the container file, one or more tile base tracks, wherein each sample of the tile base track contains or is inferred to contain one or more slice segment NAL (Network Abstraction Layer)—unit-like structures comprising a NAL unit header and NAL unit payload, said one or more tile base tracks containing a list of track references to at least one track group, wherein tracks of a common track group are alternatives to be selected as a source for extraction of the slice segment data; and
   select one of said tile base tracks for reconstruction based on decoding capacity requirements.

* * * * *